(12) United States Patent
Fukuhara et al.

(10) Patent No.: US 7,388,225 B2
(45) Date of Patent: Jun. 17, 2008

(54) ELECTRO-OPTICAL DEVICE, METHOD OF MANUFACTURING THE SAME, AND ELECTRONIC APPARATUS

(75) Inventors: Keiji Fukuhara, Eniwa (JP); Yasushi Kawakami, Eniwa (JP)

(73) Assignee: Seiko Epson Corporation, Tokyo (JP)

( * ) Notice: Subject to any disclaimer, the term of this patent is extended or adjusted under 35 U.S.C. 154(b) by 368 days.

(21) Appl. No.: 10/896,884

(22) Filed: Jul. 23, 2004

(65) Prior Publication Data

US 2005/0046761 A1 Mar. 3, 2005

(30) Foreign Application Priority Data

Aug. 4, 2003 (JP) ............... 2003-286209

(51) Int. Cl.
*H01L 27/14* (2006.01)
*G02F 1/136* (2006.01)

(52) U.S. Cl. .................. 257/59; 257/72; 257/E27.131; 349/43

(58) Field of Classification Search .................. 257/59, 257/72, E27.131, E27.132, E29.273; 349/42, 349/43, 38
See application file for complete search history.

(56) References Cited

U.S. PATENT DOCUMENTS 6,569,717 B1 * 5/2003 Murade ...................... 438/149

| 6,590,227 B2 | 7/2003 | Ishikawa |
| 6,610,997 B2 * | 8/2003 | Murade ........................ 257/72 |
| 6,639,244 B1 * | 10/2003 | Yamazaki et al. ............. 257/72 |
| 2003/0063429 A1 * | 4/2003 | Watanabe ................. 361/306.3 |

FOREIGN PATENT DOCUMENTS

| JP | 11-223832 | 8/1999 |
| JP | A-2000-305107 | 2/2000 |
| JP | 2001-147447 | 5/2001 |
| JP | 2003-202596 | 7/2003 |
| KR | 2003-0062592 | 7/2003 |
| WO | WO03/060603 A1 | 7/2003 |

* cited by examiner

*Primary Examiner*—Minh-Loan T Tran
(74) *Attorney, Agent, or Firm*—Oliff & Berridge, PLC

(57) ABSTRACT

Exemplary embodiments of the present invention include an electro-optical device including storage capacitors having excellent breakdown-voltage performance to function properly. Exemplary embodiments further include an electro-optical device including data lines, scanning lines, thin film transistors, and pixel electrodes formed on a substrate. The electro-optical device also includes storage capacitors composed of first electrodes electrically connected to the thin film transistors and the pixel electrodes, second electrodes that are arranged to face the first electrodes, and dielectric films arranged between the first electrodes and the second electrodes, and oxidation films obtained by oxidizing part or all of the surfaces of at least one of the first electrodes and the second electrodes.

8 Claims, 14 Drawing Sheets

FIG. 14
PROCESS (1)
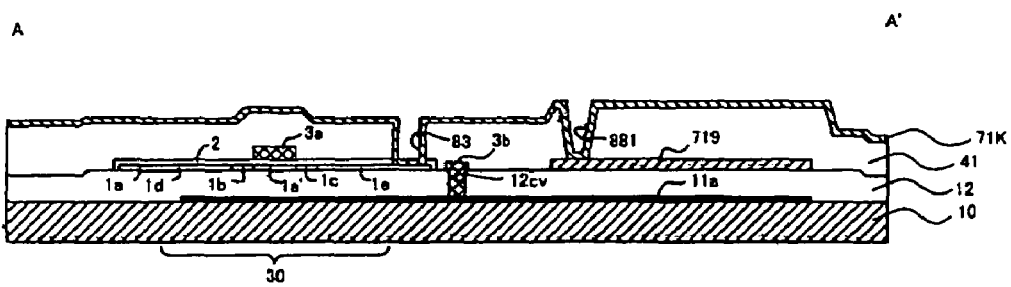
PROCESS (2)
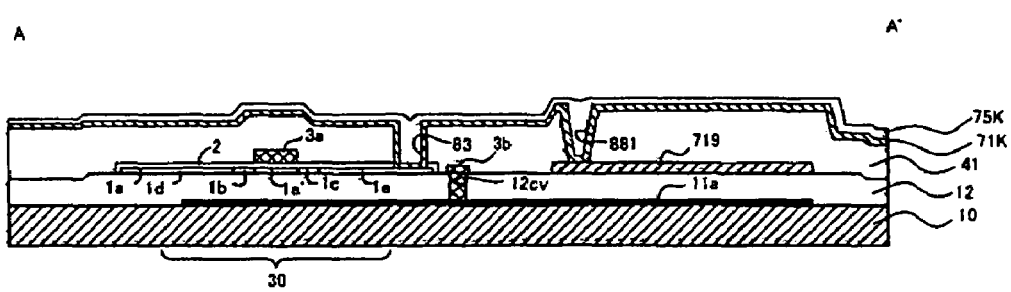
PROCESS (3)
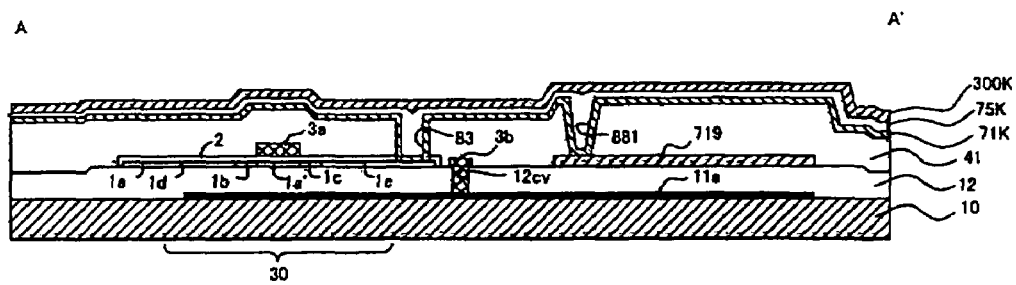

FIG. 15
PROCESS (4)
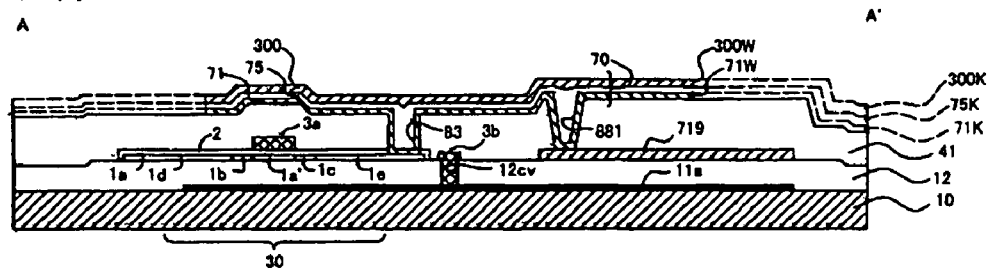
PROCESS (5)
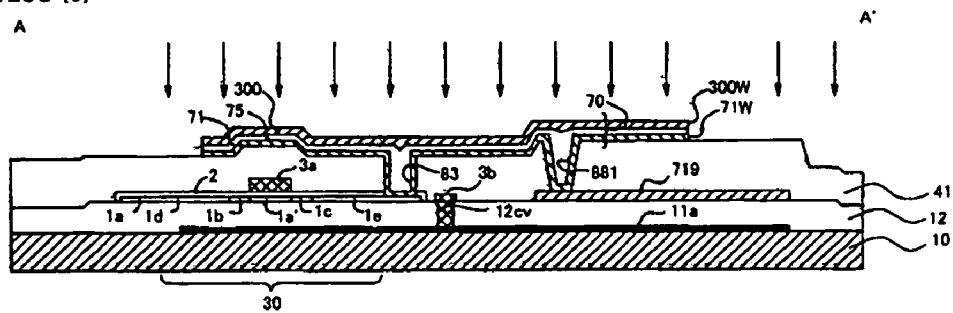
PROCESS (6)
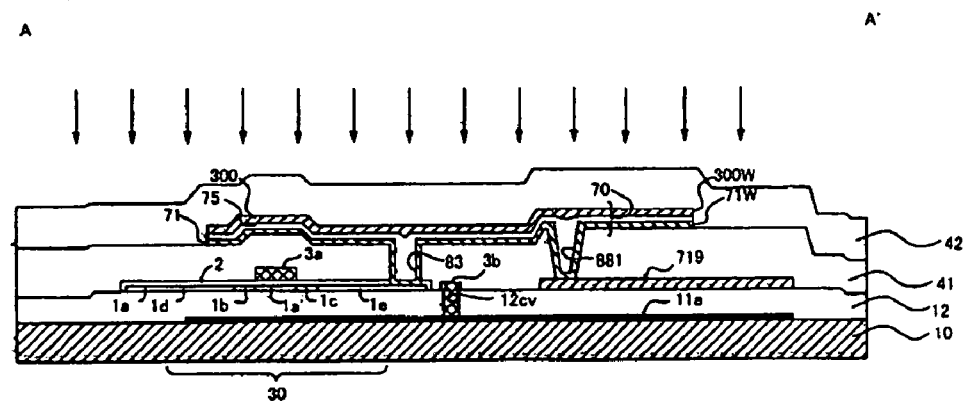

F I G. 1 6
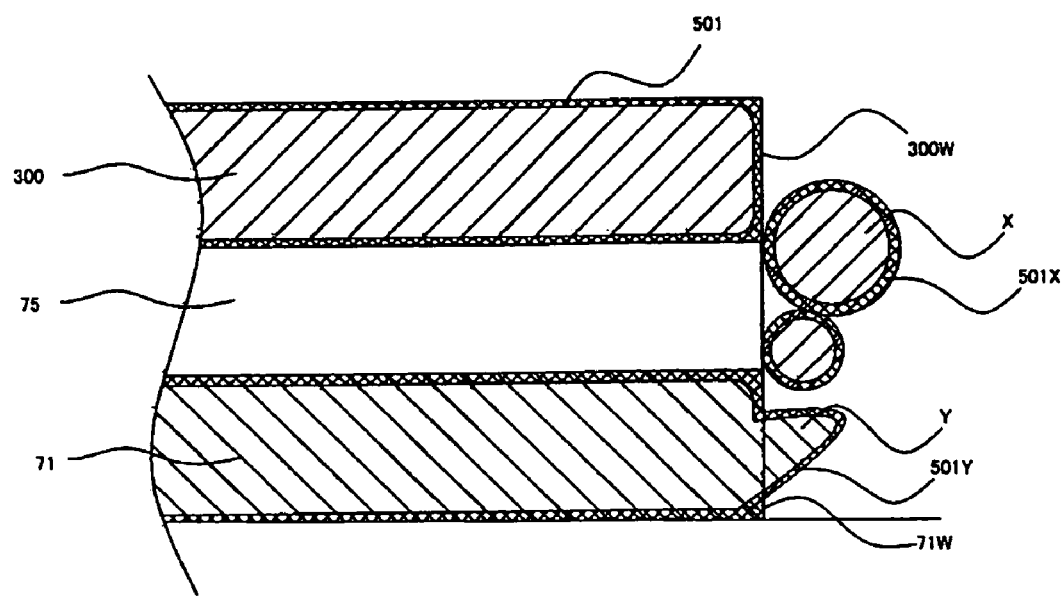

ELECTRO-OPTICAL DEVICE, METHOD OF MANUFACTURING THE SAME, AND ELECTRONIC APPARATUS

BACKGROUND OF THE INVENTION

1. Field of Invention

The present invention relates to electro-optical devices such as an active-matrix-driving liquid crystal device, an electrophoresis device such as electronic paper, an electro-luminescent (EL) display device, and a device including an electron emission element such as a field emission display and a surface-conduction electron-emitter display, and to a method for manufacturing the same. Also, the present invention relates to electronic apparatus including the electro-optical device.

2. Description of Related Art

The related art includes electro-optical devices capable of active-matrix-driving. The related art electro-optical devices include pixel electrodes arranged on a substrate in a matrix, thin film transistors (TFT) connected to each of the pixel electrodes, and data lines and scanning lines connected to the TFTs and provided in parallel in column and row directions.

The electro-optical device of the related art further includes a counter substrate that faces the substrate, counter electrodes that face the pixel electrodes on the counter substrate, and a liquid crystal layer interposed between the pixel electrodes and the counter electrodes to thus display images. That is, the alignment of liquid crystal molecules in the liquid crystal layer properly changes according to a predetermined potential difference between the pixel electrodes and the counter electrodes, such that the transmittance of light that passes through the liquid crystal layer changes to display images.

Further, the related art electro-optical device may include storage capacitors connected to the TFTs and the pixel electrodes. The storage capacitors allow the electric potential applied to the pixel electrodes to be stored for a certain period of time, such that it is possible to improve potential storage characteristics.

SUMMARY OF THE INVENTION

However, the electro-optical device according to the related art technology is subject to the following problems. That is, the storage capacitors typically have a three-layered structure including first electrodes electrically connected to the TFTs and the pixel electrodes, second electrodes that face the first electrodes and that have fixed electric potential, and dielectric films interposed between both electrodes. Here, the first and second electrodes must not be electrically connected: if the first electrodes and the second electrodes are short circuited, the storage capacitors cannot function properly.

It is advantageous for electro-optical devices to be made smaller in size, and for various components, such as TFTs, data lines, scanning lines, and pixel electrodes, including the storage capacitors, to be constructed in very small areas. However, among these components, the storage capacitors must still secure a certain amount of capacitance, that is, a minimally required electrode area, and the dielectric constant of the dielectric films must be maintained, as well as to make the electro-optical device smaller in size.

In order to satisfy these requirements, the first electrodes and the second electrodes may be formed to have the same area. Thus, it is possible to reduce or prevent the portions of the electrodes that do not face the electrodes on the other side, that is, surplus portions that do not function in the storage capacitors, from occupying the limited area on the substrate. On the other hand, since both electrodes face each other with no wasted portion, it is possible to achieve reduction and minuteness in size of the electro-optical device, and to prevent the capacitance from being reduced.

However, as described above, when the first electrodes and the second electrodes have the same area in size and face each other, in the end faces thereof, the dielectric films interposed between both electrodes are exposed to the outside. That is, the end faces of the three-layered structure are exposed to the outside. Thus, for example, in the case where the first electrodes, the dielectric film, and the second electrodes are patterned in a process of forming the storage capacitors, when etching remnants (hereinafter, referred to as remnants) are generated, the remnants attaches to the end faces. As a result, the first electrodes and the second electrodes may be short circuited. Even if the first electrodes and the second electrodes are not short circuited, electrostatic focusing may occur in the end due to the remnants, to deteriorate a breakdown-voltage performance.

Furthermore, such problems still may occur in other related art devices even when the first electrodes and the second electrodes have the same area in size. For example, when the electrodes on the lower side protrude from the electrodes on the upper side in plan view (hereinafter, referred to as the upper electrodes) and the dielectric film, if the end faces of the upper electrodes and the dielectric films are exposed to the outside, the electrostatic focusing occurs at the edge portions of the end faces of the upper electrodes to deteriorate the breakdown-voltage performance as described above.

Exemplary embodiments of the present invention address or solve the above and/or other problems. Further, exemplary embodiments of the present invention provide an electro-optical device comprising storage capacitors with an excellent breakdown-voltage performance, which can function properly, and a method of manufacturing the same. Exemplary embodiments of the present invention provide an electronic apparatus including such an electro-optical device.

In order to address or solve the above and/or other problems, an electro-optical device is provided including data lines extending above a substrate; scanning lines extending in a direction intersecting the data lines; thin film transistors having semiconductor layers and gate electrodes to which scanning signals are supplied by the scanning lines; pixel electrodes to which image signals are supplied by the data lines through the thin film transistors; storage capacitors having first electrodes electrically connected to the thin film transistor and the pixel electrodes, second electrodes facing the first electrodes, and dielectric films interposed between the first electrodes and the second electrodes; and oxidation films obtained by oxidizing parts of the surfaces of at least one of the first electrodes and the second electrodes.

According to the electro-optical device of exemplary embodiments of the present invention, image signals are supplied from the data lines to the pixel electrodes, and the supply of the image signals from the data lines to the pixel electrodes is stopped in accordance with the switching ON and OFF of thin film transistors whose switching is controlled by scanning signals. Therefore, active-matrix-driving can be performed. Also, according to exemplary embodiments of the present invention, since the storage capacitors comprise the first electrodes, the dielectric film, and the second electrodes, for example, it is possible to significantly enhance or improve the potential storage characteristics of the pixel electrodes and to thus significantly enhance or improve the image quality. The storage capacitors referred to in the exemplary embodiments of the present invention function as a memory capable of temporarily accumulating electric potential based on the image signals, prior to applying the same to the pixel electrodes, while it also enhances or improves the potential storage characteristics of the pixel electrodes.

According to exemplary embodiments of the present invention, in particular, oxidation films are formed on all or part of the surfaces of at least one of the first electrodes and the second electrodes. Therefore, the short-circuit of the first electrodes and the second electrodes is mostly reduce or prevented by the oxidation films. In particular, since the edge portions of the first electrodes, to be described later, and the edge portions of the second electrodes may be included in the surfaces and the oxidation films may be formed on the edges, it is possible to significantly enhance or improve the breakdown-voltage performance of the storage capacitors.

In forming the first electrodes and the second electrodes, even when remnants are generated during the patterning of precursor films, remnants are also oxidized to thus constitute part of the oxidation film, such that it is possible to reduce or prevent the breakdown-voltage performance from deteriorating due to the remnants.

According to exemplary embodiments of the present invention, the surfaces include the surfaces (hereinafter, contact surfaces) where the dielectric films and the capacitor electrodes on the side of the pixel electrodes contact each other as well as the surfaces where the dielectric films and the capacitor electrodes on the side of the pixel electrodes do not contact each other. In the case where the dielectric films are made of a silicon oxide film, the oxygen used in a process of oxidizing the first electrodes may reach the contact surfaces through the dielectric films to oxidize the contact surfaces. Although referred to as the surface, the vicinities close to the insides of the first electrodes as well as the surfaces of the first electrodes, as it may be understood without explanation, change into the oxidation films. The surfaces include such instances. The above-described is true for the second electrodes.

The oxidation film according to exemplary embodiments of the present invention does not only mean a typically plane film. For example, even if only the edge portions to be described later are oxidized, the oxidized portions are also included in the range of the oxidation film.

Furthermore, according to exemplary embodiments of the present invention, the storage capacitors may be part of a laminated structure composed of the thin film transistors, data lines, scanning lines, and pixel electrodes on the substrate. That is, the storage capacitors may be formed as a three-layered laminated structure composed of the first electrodes, the dielectric film, and the second electrodes. In this case, at the positions of the first electrodes and the second electrodes, any one may be in the upper layer or in the lower layer.

According to an exemplary aspect of the electro-optical device of the present invention, the surfaces include the end faces of at least one of the first electrodes and the second electrodes.

According to the exemplary aspect, the end face means the plane of the portion corresponding to a wall, which is connected to the edge portions of the patterns obtained by patterning the first electrodes, the dielectric film, and the second electrodes. Here, for example, when the patterning is performed such that the dielectric films and at least one of the first electrodes and the second electrodes are formed on the same plane (The plane is typically an imaginary plane perpendicularly to the substrate, and the wall is formed on the plane), the plane of the wall, that is, the end faces includes the ends of the capacitor electrodes on the side of the pixel electrodes, the ends of the dielectric films, and the ends of the second electrodes, such that the insulation between the first electrodes and the second electrodes is easily damaged due to the short circuit and the electrostatic focusing. However, according to exemplary embodiments of the present invention, since the oxidation film is formed in the end faces, it is possible to enhance or improve the above-described effects.

According to the exemplary aspect, the end faces may include the edge portions of at least one of the first electrodes and the second electrodes.

According to such a structure, because the oxidation film is formed on the edge portions where defect such as damage of the insulation between the first electrodes and the second electrodes caused by the electrostatic focusing is easily generated compared with the end faces, it is possible to enhance or improve the breakdown-voltage performance of the storage capacitors.

The edge portions according to the present structure, for example, when each of the first electrodes is a rectangle, correspond to six corners that constitute the rectangle. The above-described is also true for the second electrodes.

According to the present structure, in regard to the edge portions of at least one of the first electrodes and the second electrodes, the edge portions of both the first electrodes and the second electrodes may be oxidized, which is more preferable than the case where the oxidation film is formed only on the edge portions of at least one of the first electrodes and the second electrodes. It is more preferable that all of certain edge portions of the first electrodes and the edge portions of the second electrodes that face the certain edge portions of the first electrodes with the dielectric films interposed, be oxidized. Therefore, it is possible to enhance or improve the breakdown-voltage performance.

Alternatively, according to an exemplary aspect in which the oxidation film is formed on the "end faces", the end faces may be placed on the same plane that intersects the substrate.

According to such a structure, as described above, since the end faces include the end faces of the first electrodes, the end faces of the dielectric film, and the end faces of the second electrodes, defect such as damage of the insulation caused by the electrostatic focusing is easily generated. However, according to exemplary embodiments of the present invention, it is possible to reduce or prevent such a defect.

According to another exemplary aspect of the electro-optical device of the present invention, the oxidation films are preferably formed on the surfaces of at least one of the first electrodes and the second electrodes, which face the dielectric films.

Furthermore, the oxidation film is preferably formed on all of the surfaces of the second electrodes.

More preferably, the oxidation film is formed on all of the surfaces of the first electrodes and the second electrodes.

According to another exemplary aspect of the electro-optical device of the present invention, a thickness of the oxidation film is no less than 1.5 [nm] and no more than 30 [nm].

According to the exemplary aspect, since the thickness of the oxidation film is properly determined, it is possible to obtain the following effects. That is, when the thickness of the oxidation film is smaller than 1.5 [nm], it is not possible to obtain a sufficient insulation effect and thus to obtain sufficient breakdown-voltage performance of the storage capacitors. On the other hand, when the thickness of the oxidation film is larger than 30 [nm], for example, in a thermal oxidation process for obtaining such an oxidation film, the semiconductor layers of the thin film transistors are also oxidized, which reduces the switching ON current of the thin film transistors. Thus, according to the present exemplary aspect, it is possible to enhance or improve the breakdown-voltage performance of the storage capacitors and to obtain thin film transistors that operate properly.

According to another exemplary aspect of the electro-optical device of the present invention, the dielectric films include a silicon nitride film.

According to the exemplary aspect, since the dielectric films include a silicon nitride film, which has a relatively large dielectric constant, it is possible to increase the capacitance of the storage capacitors. Thus, compared with the case in which the dielectric films are composed of only the silicon oxide film, it is possible to reduce the thickness of the dielectric films according to the present exemplary aspect, so that such that it is possible to achieve reduction and minuteness in size of the electro-optical device and to reduce the manufacturing time in some cases.

When the thickness of the dielectric films is reduced, since the distance between the first electrodes and the second electrodes is reduced, there is a fear of deterioration of the breakdown-voltage performance of the storage capacitors. However, according to the exemplary embodiment of the present invention, as described above, since the first electrodes and the second electrodes are oxidized, such a fear is almost dispelled. That is, since the dielectric films include the silicon nitride film, even when the thickness of the dielectric films is very small, there is little fear of deterioration of the breakdown-voltage performance of the storage capacitors.

As described above, according to the present exemplary aspect, it is possible to increase the capacitance of the storage capacitors and enhance or improve the breakdown-voltage performance of the storage capacitors. Thus, the present exemplary aspect is one of the optimal aspects for obtaining the effects of the present invention.

According to another exemplary aspect of the electro-optical device of the present invention, the first electrodes are made of a light shielding material, and are arranged to cover the channel regions of the semiconductor layers that constitute the thin film.

According to the exemplary aspect, since it is possible to prevent light from being incident on the semiconductor layers that constitute the thin film transistors, the generation of light leakage current in the semiconductor layers can be reduced or prevented. As a result, flickers can be reduced or prevented from being generated in images. Also, even in the present exemplary aspect, since defect such as damage of the insulation between the first electrodes and the second electrodes caused by the short circuit and the electrostatic focusing may be generated, it is possible to show the further effects of the present invention. That is, according to the present exemplary aspect, since the storage capacitors can further function as a light shielding film, it is possible to simplify the structure of the electro-optical device and to achieve reduction and minuteness in size of the electro-optical device.

The light shielding material according to the present exemplary aspect refers to a elemental metal, an alloy, metal silicide, polysilicide including at least one of high melting metals such as Ti, Cr, W, Ta, and Mo, and a laminate thereof. In particular, the light shielding material is Wsi, CoSi, and TiSi in view of light absorbing performance.

According to another exemplary aspect of the electro-optical device of the present invention, the second electrodes have a fixed electric potential.

According to the exemplary aspect, the storage capacitors can properly accumulate desired charges.

As noted from the present exemplary aspect to the contrary, the second electrodes according to exemplary embodiments of the present invention may not necessarily have a fixed potential. For example, the electric potential of the second electrodes may be variable or floating.

Exemplary embodiments of the present invention include a method for manufacturing an electro-optical device including data lines extending to a constant direction above a substrate, scanning lines extending in a direction intersecting the data lines, thin film transistors including semiconductor layers and gate electrodes to which scanning signals are supplied by the scanning lines and pixel electrodes to which image signals are supplied by the data lines through the thin film transistors. The exemplary method includes forming precursor films of first electrodes electrically connected to the thin film transistors and the pixel electrodes, forming precursor films of dielectric films on the first electrodes, forming precursor films of second electrodes on the dielectric films, forming storage capacitors by patterning the precursor films of the first electrodes, the dielectric films, and the second electrodes to form the first electrodes, the dielectric films, and the second electrodes, and oxidizing all or part of the surfaces of at least one of the first electrodes and the second electrodes to form oxidation films.

According to the exemplary method for manufacturing the electro-optical device of the present invention, it is possible to properly manufacture the electro-optical device according to the present invention.

In particular, according to exemplary embodiment of the present invention, an oxidation process is performed on the first electrodes and the second electrodes. The first electrodes and the second electrodes are formed by patterning each of the precursor films as described above and the oxidation process according to exemplary embodiments of the present invention is performed on the first electrodes and the second electrodes that are completed. Thus, the remnants generated in the patterning process are oxidized in the oxidation process. As a result, in the storage capacitors, defect such as short circuit between both of the electrodes or electrostatic focusing caused by the remnants is reduced or not generated, and it is possible to properly maintain excellent breakdown-voltage performance.

The oxidation process according to exemplary embodiments of the present invention includes a process of performing an anodic oxidation, a process of performing sulfuric acid cleaning, and a process of performing a plasma process in an proper chamber into which ozone is introduced.

The aspects of the oxidation films and the surfaces herein described in the present invention are the same as those described with respect to the electro-optical device of the present invention.

According to an exemplary aspect of the method for manufacturing the electro-optical device of the present invention, the surfaces include the end faces of at least one of the first electrodes and the second electrodes that are obtained by performing patterning.

According to the exemplary aspect, in typical "end faces" that include the ends of the first electrodes, the ends of the dielectric films, and the ends of the second electrodes, defect such as damage of the insulation between the first electrodes and the second electrodes caused by short circuiting and electrostatic focusing is easily generated. However, according to exemplary embodiments of the present invention, because the oxidation film is formed on the end faces, it is possible to enhance or improve the above-described effects. The aspect of the end faces is the same as that described in an aspect of the electro-optical device according to the present invention.

According to this exemplary aspect, the end faces may include the edge portions of at least one of the first electrodes and the second electrodes that are obtained by performing patterning.

According to such a structure, since the oxidation film is formed on the edge portions in which defect such as damage of the insulation between the first electrodes and the second electrodes caused by the electrostatic focusing is more easily generated compared to the end faces, it is possible to enhance or improve the breakdown-voltage performance of the storage capacitors. The aspect of the edge portions is the same as that described in an aspect of the electro-optical device according to the present invention.

According to another exemplary aspect of the electro-optical device of the present invention, the process of forming the oxidation film includes a thermal oxidation process.

According to this exemplary aspect, it is possible to easily and rapidly oxidize the first electrodes and the second electrodes. According to the thermal oxidation process of the present exemplary aspect, since oxygen is easily diffused on the surfaces of both electrodes and into the vicinities close to the insides of both electrodes, it is possible to form a stable oxidation film. As a result, the breakdown-voltage performance of the storage capacitors can be enhanced or improved.

Furthermore, when the typical thermal oxidation process according to the present exemplary aspect is performed, the edge portions of the first electrodes and the second electrodes can be more easily oxidized. As noted from the case in which the first electrodes and the second electrodes are made of single crystal silicon, a plane (for example, a plane 111) having an orientation in which oxidation can be more easily performed compared to the other portions, is revealed at the edge portions. The above-described is not limited to the case in which both electrodes are made of the single crystal silicon; it is also true of more general cases.

As described above, according to the present exemplary aspect, since it is possible to reliably and easily form the oxidation film on the edge portions where defect such as damage of the insulation between both electrodes caused by electrostatic focusing is easily generated, the present aspect is very suitable for enhancing or improving the breakdown-voltage performance of the storage capacitors.

According to this exemplary aspect, the thermal oxidation process may be performed such that the thickness of the oxidation film is no less than 1.5 [nm] and no more than 30 [nm].

According to this exemplary aspect, since the thickness of the oxidation film is properly determined, it is possible to obtain the following effects. That is, when the thickness of the oxidation film is smaller than 1.5 [nm], it is not possible to obtain a sufficient insulation effect and thus it is not possible to obtain sufficient breakdown-voltage performance of the storage capacitors. On the other hand, when the thickness of the oxidation film is larger than 30 [nm], for example, in a thermal oxidation process for obtaining such an oxidation film, the semiconductor layers of the thin film transistors are also oxidized, thus reducing the switching ON current of the thin film transistors. Thus, according to the present exemplary aspect, it is possible to enhance or improve the breakdown-voltage performance of the storage capacitors and to obtain the thin film transistors that operate properly.

The thermal oxidation process may be performed in an atmosphere where the temperature is no less than 350 [° C.].

According to such a structure, it is possible to more accurately and rapidly oxidize the first electrodes and the second electrodes. In the thermal oxidation process, since the atmosphere temperature significantly contributes to the speed at which the oxidation film is formed, the atmosphere temperature should be as high as possible. From such a point of view, the oxidation temperature is preferably no less than 800 [° C.].

The thermal oxidation process may be performed in an atmosphere where the oxygen concentration is no less than 2 [%].

According to such a structure, it is possible to more accurately and rapidly oxidize the first electrodes and the second electrodes.

Furthermore, the exemplary aspect including the thermal oxidation process further includes a process of forming an interlayer insulating film on the storage capacitors. The thermal oxidation process may be performed after the process of forming the interlayer insulating film.

According to such a structure, since a process of firing the interlayer insulating film that is completed and the process of oxidizing the electrodes that constitute the storage capacitors can be simultaneously performed, it is possible to simplify the manufacturing processes and to rapidly manufacture the electro-optical device.

As described above, when the firing process and the oxidation process are simultaneously performed, the process is preferably performed in an atmosphere where an proper amount of oxygen gas is applied to nitrogen gas.

According to such a structure, a process of forming the data lines on the interlayer insulating film is further included. The thermal oxidation process may be performed in an atmosphere where the temperature of the material that constitutes the data lines is no more than a melting point.

According to such a structure, it is possible to oxidize the first electrodes or the second electrodes without melting the data line made of, for example, aluminum. According to the present structure, the data lines are assumed. However, the spirit of the present structure is also true for various components other than the data lines. For example, in the case where a laminated structure is formed on the storage capacitors in order of a first interlayer insulating film, the data lines, a second interlayer insulating film, capacitor wiring lines connected to the second electrodes, a third interlayer insulating film, and the pixel electrodes, the thermal oxidation process can be performed at a temperature no higher than the lowest melting point of the melting points of the data lines, the capacitor wiring lines, and the pixel electrodes.

According to another exemplary aspect of the electro-optical device of the present invention, the process of forming the storage capacitors includes a process of patterning at least one of the first electrodes and the second electrodes to have the same planar shape as the dielectric film.

According to this exemplary aspect, for example, the end faces of the second electrodes and the end faces of the dielectric films are placed on the same plane. Therefore, even if the first electrodes having the area larger than the area of the second electrodes and the dielectric films exist under the dielectric film, that is, even if the end faces of the first electrodes are not placed on the plane, the insulation between the surfaces of the first electrodes and the end faces or the edge portions of the second electrodes can be damaged. However, according to exemplary embodiments of the present invention, even in this case, since the first electrodes or the second electrodes are oxidized, there is little fear that the breakdown-voltage performance of the storage capacitors deteriorates. Hence, contrary to the effect of the above case, it is still possible to enhance or improve the effects according to exemplary embodiments of the present invention.

Patterning is performed to have the same planar shape as the dielectric films means that the planar shapes of the dielectric films and the first electrodes are the same, as a result of simultaneously patterning the precursor films of the dielectric films and the precursor films of the first electrodes, and also the planar shape of the dielectric films is formed by patterning the dielectric films and the precursor films of the first electrodes are formed and patterned.

According to another exemplary aspect of the electro-optical device of the present invention, the process of forming the storage capacitors includes a process of simultaneously patterning the first electrodes, the dielectric film, and the second electrodes.

According to this exemplary aspect, since the process simultaneously patterns the first electrodes, the dielectric film, and the second electrodes, it is possible to simplify the manufacturing processes compared to the case in which processes of patterning the three components that constitute the storage capacitors are separately carried out.

According to the present exemplary aspect, in particular, since the process simultaneously patterns the first electrodes, the dielectric film, and the second electrodes, the end faces of the first electrodes, the end faces of the dielectric films, and the end faces of the second electrodes are placed on the same plane. That is, since all of the ends of the first electrodes, the ends of the dielectric films, and the ends of the second electrodes are on the same plane, the insulation between the first electrodes and the second electrodes is easily susceptible to the damage caused by electrostatic focusing. However, according to exemplary embodiments of the present invention, as described above, since the first electrodes or the second electrodes are oxidized, there is little fear that the breakdown-voltage performance of the storage capacitors deteriorates. Contrary to the effect of above case, it is possible to obtain the effects according to the present invention.

An electronic apparatus according to the present invention includes the above described electro-optical device (including various exemplary aspects).

Since the electronic apparatus of exemplary embodiments of the present invention includes the above described electro-optical device having the storage capacitors which exhibit an excellent breakdown-voltage performance, it is possible to realize various electronic apparatuses, such as a projection-type display device, a liquid crystal TV, a mobile telephone, an electronic pocketbook, a word processor, a viewfinder-type or monitor-direct-view-type video tape recorder, a workstation, a videophone, a POS terminal, and a touch panel, capable of displaying high quality images.

The operation and advantages of the present invention will be described with reference to exemplary embodiments, to be described later.

BRIEF DESCRIPTION OF THE DRAWINGS

FIG. 14 includes sectional views (No. 1) sequentially illustrating the manufacturing processes of an electro-optical device according to an exemplary embodiment of the present invention shown in FIG. 4;

FIG. 15 includes sectional views (No. 2) sequentially illustrating the manufacturing processes of the electro-optical device according to an exemplary embodiment of the present invention shown in FIG. 4;

FIG. 16 is a schematic that shows remnants generated by a patterning process with the same or similar purpose as FIG. 5;

DETAILED DESCRIPTION OF PREFERRED EMBODIMENTS

Exemplary embodiments of the present invention will now be described with reference to the drawings. According to the exemplary embodiment, an electro-optical device according to the present invention is applied to a liquid crystal device.

Figure 1:
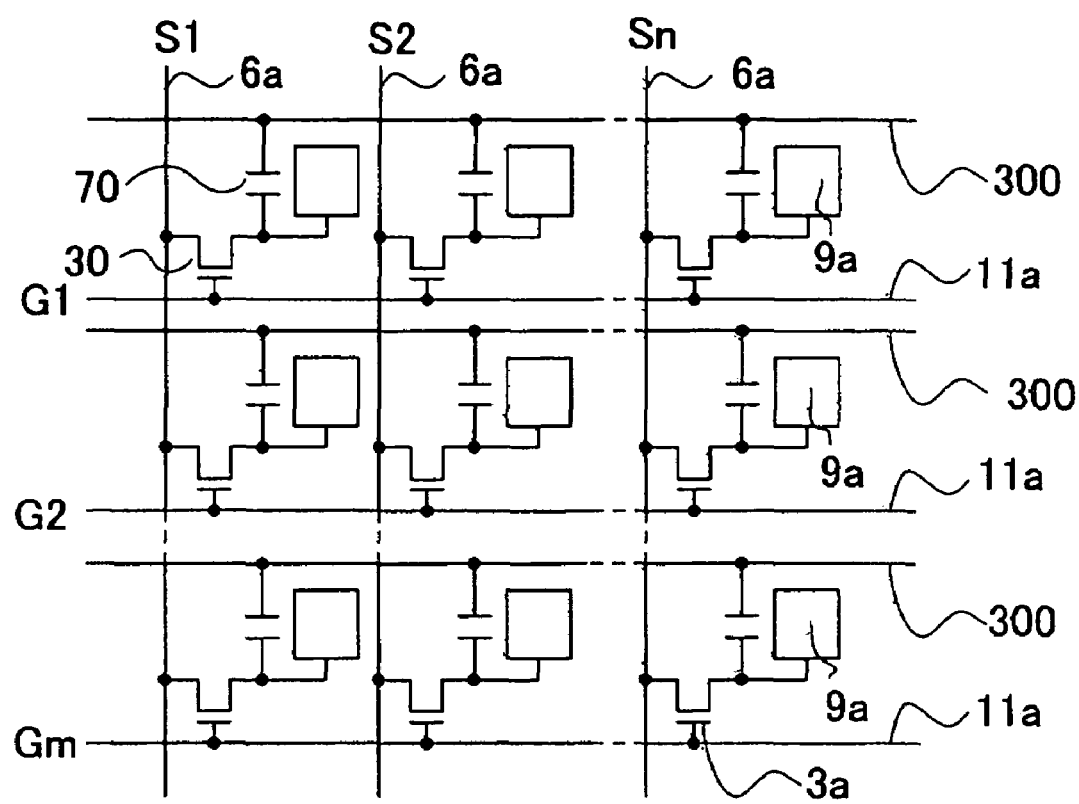
FIG. 1 is a schematic that shows an equivalent circuit of various elements and wiring lines in a plurality of pixels formed in a matrix, which constitute an image display region of an electro-optical device.
Figure 2:
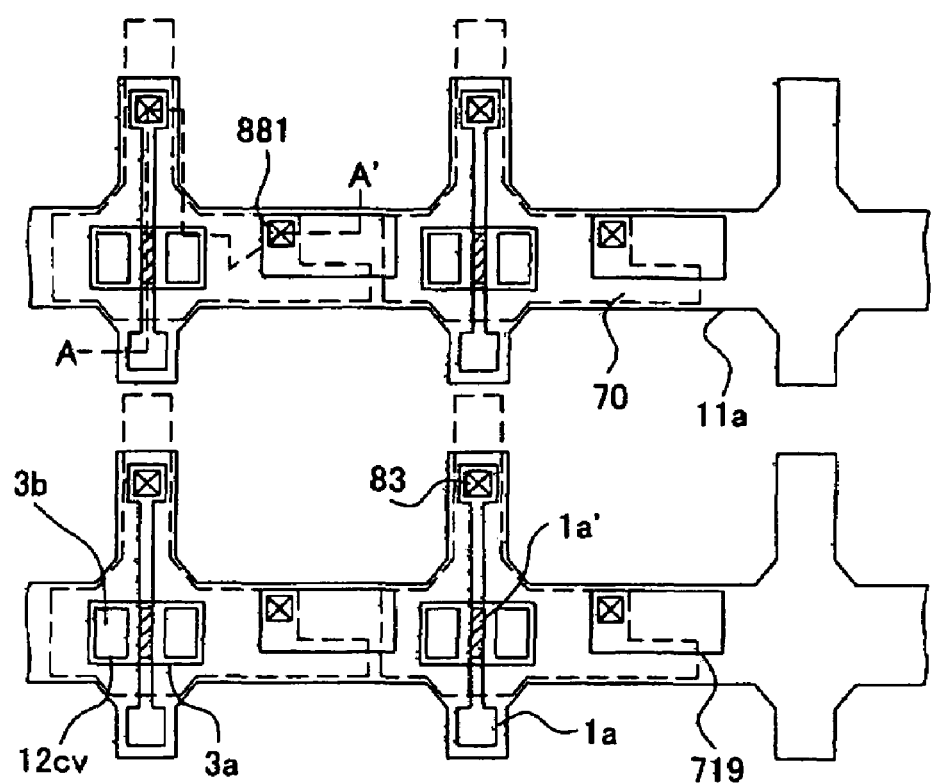
FIG. 2 is a plan view of a plurality of pixel groups adjacent to each other on a TFT array substrate on which data lines, scanning lines, and pixel electrodes are formed, which shows only a lower portion (below the reference numeral 70 (storage capacitors) in FIG. 4)
Figure 3:
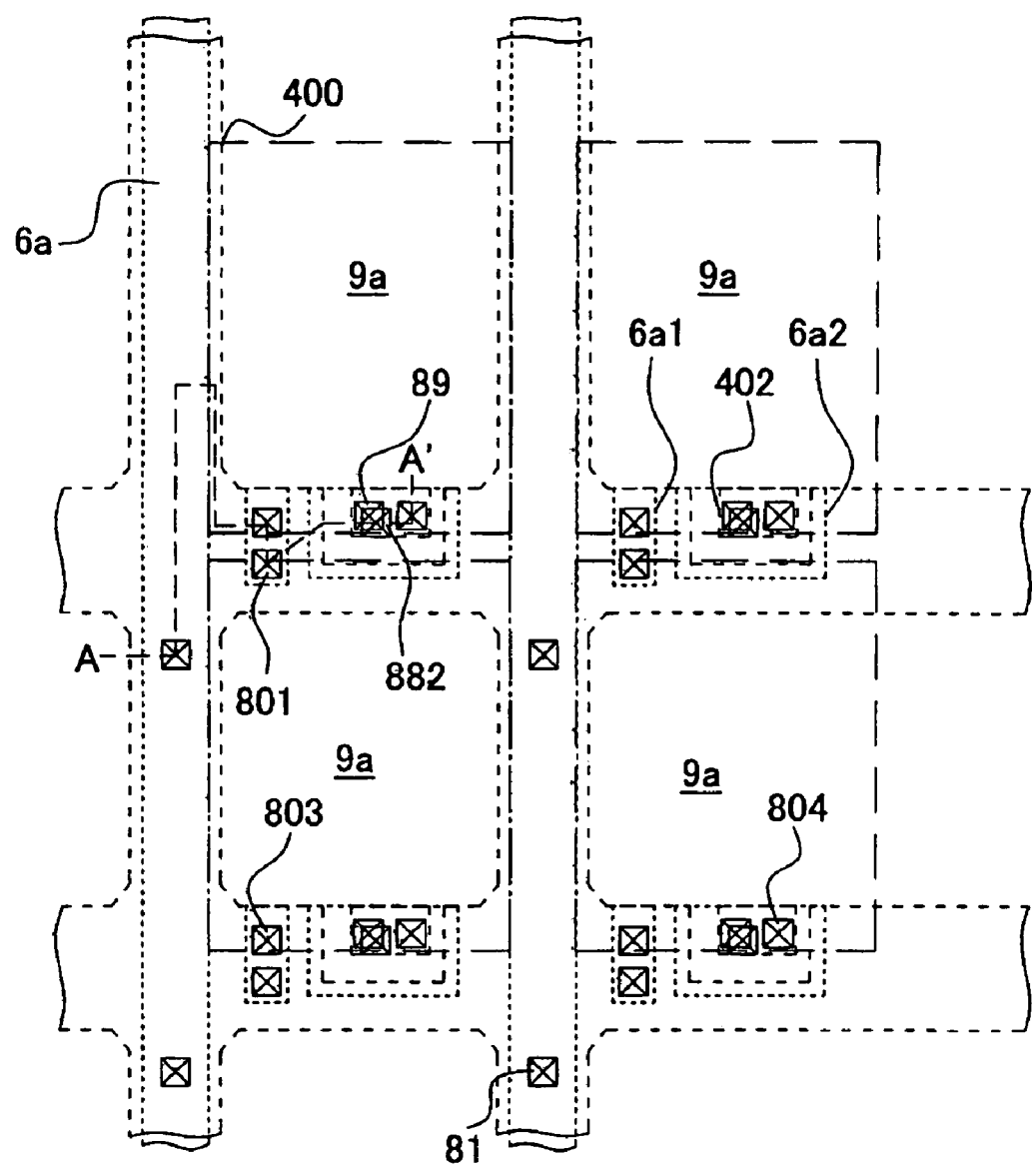
FIG. 3 is a plan view of the plurality of pixel groups adjacent to each other of the TFT array substrate on which the data lines, the scanning lines, and the pixel electrodes are formed, which shows only an upper portion (above the reference numeral 70 (storage capacitors) in FIG. 4)
Figure 4:
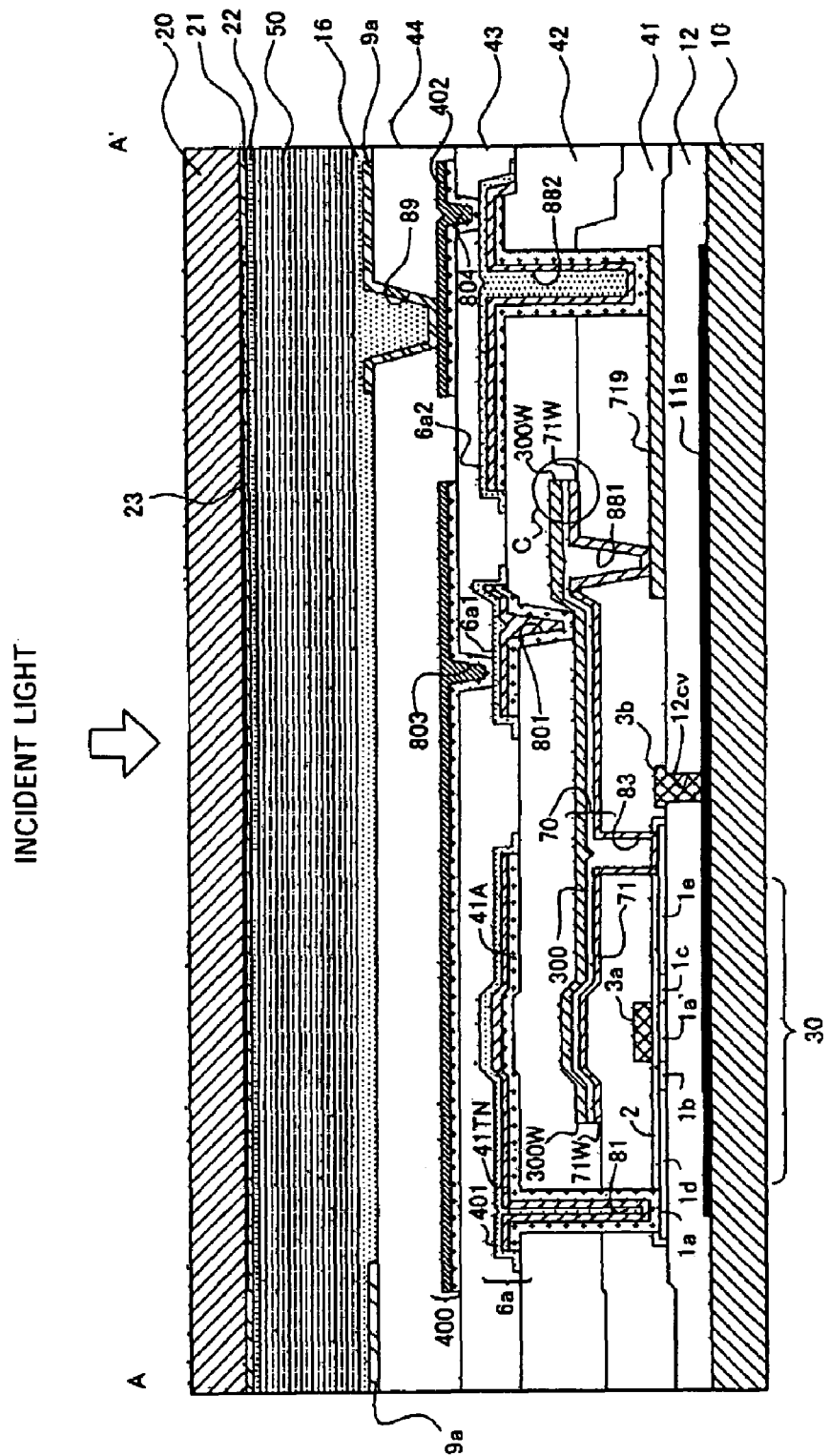
FIG. 4 is a sectional view taken along the line A-A' when FIGS. 2 and 3 overlap.

The structure of a pixel portion of an electro-optical device according to an exemplary embodiment of the present invention will now be described with reference to FIGS. 1 to 4. Here, FIG. 1 is a schematic that shows an equivalent circuit of various elements, wiring lines, etc. in a plurality of pixels formed in a matrix that constitutes an image display region of the electro-optical device. FIGS. 2 and 3 are schematics that show plan views of a plurality of pixel groups adjacent to each other on a TFT array substrate on which data lines, scanning lines, and pixel electrodes are formed. Also, FIGS. 2 and 3 respectively illustrate a lower portion (FIG. 2) and an upper portion (FIG. 3) in a laminated structure to be described later. FIG. 4 is a schematic that shows a sectional view taken along the line A-A' in the case where FIGS. 2 and 3 overlap. In FIG. 4, the contraction scales of each layer and member are different to make each layer and member recognizable in the figure.

Hereinafter, after describing the basic structure of the electro-optical device according to the present exemplary embodiment, characteristic structures of the present exemplary embodiment will be described in detail later in sections "Structure of Storage Capacitor" and "Method of Manufacturing Storage Capacitor".

(Circuit Structure of Pixel Portion)

In FIG. 1, pixel electrodes 9a and TFTs 30 for switching and controlling the pixel electrodes 9a are formed in a plurality of pixels in a matrix that constitutes an image display region of an electro-optical device according to the present embodiment. Data lines 6a to which image signals are supplied are electrically connected to the sources of the TFTs 30. The image signals S1, S2, . . . , and Sn written in the data lines 6a may be line-sequentially supplied in this order and may be supplied to respective groups each being composed of a plurality of adjacent data lines 6a.

Gate electrodes 3a are electrically connected to the gates of the TFTs 30. At a predetermined timing, scanning signals G1, G2, . . . , and Gm are line-sequentially applied to scanning lines 11a and the gate electrodes 3a as pulses in this order. The pixel electrodes 9a are electrically connected to the drains of the TFTs 30, and the switches of the TFTs 30, which are switching elements, are closed for a certain period of time, such that the image signals S1, S2, . . . , and Sn supplied from the data lines 6a are written at a predetermined timing.

The image signals S1, S2, . . . , and Sn of a predetermined level that are written in liquid crystal, an example of an electro-optical material, through the pixel electrodes 9a are stored between counter electrodes formed on a counter substrate for a certain period. The alignment or order of the molecules of the liquid crystal changes according to the level of an applied voltage, such that light is modulated to thus display a grayscale. In a normally white mode, the transmittance of incident light decreases in accordance with the voltage applied to each pixel unit. In a normally black mode, the transmittance of the incident light increases in accordance with the voltage applied to each pixel unit. Thus, light having contrast in accordance with the image signals is emitted from the electro-optical device.

Here, in order to prevent the stored image signals from leaking, storage capacitors 70 are added in parallel to the liquid crystal capacitors formed between the pixel electrodes 9a and the counter electrodes. The storage capacitors 70 are provided in the regions of the scanning lines 11a and the data lines 6a and include fixed-electric-potential-side capacitor electrodes and the capacitor electrodes 300 fixed to the electrostatic potential.

[Specific Structure of Pixel Portion]

The specific structure of the electro-optical device in which the above-described circuit operation is realized by the data lines 6a, the scanning lines 11a, the gate electrodes 3a, and the TFTs 30 will now be described with reference to FIGS. 2 to 4.

First, in FIGS. 3 and 4, the plurality of pixel electrodes 9a are provided on a TFT array substrate 10 in a matrix (the contours are marked with dotted lines) and the data lines 6a and the scanning lines 11a are provided along the vertical and horizontal boundaries of the pixel electrodes 9a. The data lines 6a have a laminated structure including aluminum, to be described later. The scanning lines 11a are made of, for example, a conductive polysilicon film, etc. The scanning lines 11a are electrically connected to the gate electrodes 3a that face channel regions 1a' in the regions marked with upward-leaning oblique lines in semiconductor layers 1a through contact holes 12cv. The gate electrodes 3a are included in the scanning lines 11a. That is, in the channel region 1a' of the portions where the gate electrodes 3a intersect the data lines 6a, the pixel switching TFTs 30 in which the gate electrodes 3a included in the scanning lines 11a are oppositely disposed thereto are provided. Thus, the TFTs 30 (excluding the gate electrodes 3a) are positioned between the gate electrodes 3a and the scanning lines 11a.

As illustrated in FIG. 4, which is a schematic that shows a sectional view taken along the line A-A' of FIGS. 2 and 3, the electro-optical device comprises the TFT array substrate 10 made of a quartz substrate, a glass substrate, a silicon substrate, etc. and a counter substrate 20 made of a glass substrate or a quartz substrate, which faces the TFT array substrate 10.

On the side of the TFT array substrate 10, as illustrated in FIG. 4, the pixel electrodes 9a are provided. An alignment film 16, on which a predetermined alignment process such as a rubbing process is performed, is provided on the pixel electrodes 9a. The pixel electrodes 9a are made of, for example, a transparent conductive film such as an indium tin oxide (ITO) film. On the other hand, on the side of the counter substrate 20, counter electrodes 21 are provided over the entire surface. An alignment film 22 on which a predetermined alignment process such as a rubbing process is performed is provided under the counter electrodes 21. The counter electrodes 21 are made of a transparent conductive film such as an ITO film, like the above-described pixel electrodes 9a.

An electro-optical material such as liquid crystal is filled in a space surrounded by a sealing material 52 (refer to FIGS. 17 and 18), to be described later, between the TFT array substrate 10 and the counter substrate 20 that face each other, to form a liquid crystal layer 50. The liquid crystal layer 50 is given a predetermined alignment state by the alignment films 16 and 22 when an electric field is not applied from the pixel electrodes 9a.

On the other hand, on the TFT array substrate 10, various components including the pixel electrodes 9a and the alignment film 16 form a laminated structure. As illustrated in FIG. 4, the laminated structure is composed of a first layer including the scanning lines 11a, a second layer including the TFTs 30 that include the gate electrodes 3a, a third layer including the storage capacitors 70, a fourth layer including data lines 6a, a fifth layer including capacitor wiring lines 40, and a sixth layer (the uppermost layer) including the pixel electrodes 9a and the alignment film 16, in order from the bottom. An underlying insulating film 12 is provided between the first layer and the second layer. A first interlayer insulating film 41 is provided between the second layer and the third layer. A second interlayer insulating film 42 is provided between the third layer and the fourth layer. A third interlayer insulating film 43 is provided between the fourth layer and the fifth layer. A fourth interlayer insulating film 44 is provided between the fifth layer and the sixth layer. Thus, it is possible to reduce or prevent the above-described components from being short circuited. Contact holes for electrically connecting heavily doped source regions 1d in the semiconductor layers 1a of the TFTs 30 to the data lines 6a are provided in the respective insulating films 12, 41, 42, 43, and 44. The respective components will now be sequentially described from the bottom. Among the above-described structure, from the first layer to the third layer is illustrated in FIG. 2 as a lower portion. From the fourth layer to the sixth layer is illustrated in FIG. 3 as an upper portion.

(Laminated Structure: Structure of First Layer, such as Scanning Lines)

First, scanning lines 11a are provided in the first layer. The scanning lines 11a are made of elemental metal, an alloy, metal silicide, polysilicide including at least one high-melting-point metal such as Ti, Cr, W, Ta, and Mo, and a laminate thereof, or conductive polysilicon. The scanning lines 11a are patterned in stripes in plan view in the direction X of FIG. 2. To be more specific, the scanning lines 11a in stripes include main line portions that extend in the X-direction of FIG. 2, and protrusion portions that extend in the Y-direction of FIG. 2 to which the data lines 6a or the capacitor wiring lines 400 extend. The protrusion portions that extend from the adjacent scanning lines 11a are not connected to each other. Thus, each of the scanning lines 11a is isolated.

(Laminated Structure: Structure of Second Layer such as TFTs)

Next, the TFTs 30 including the gate electrodes 3a are provided as the second layer. As illustrated in FIG. 4, the TFTs 30 have a lightly doped drain (LDD) structure and include the above-described gate electrodes 3a, the channel regions 1a' of the semiconductor layers 1a, which are made of a polysilicon film and which have channels formed by the electric field from the gate electrodes 3a, insulating films 2 including a gate insulating film for insulating the gate electrodes 3a from the semiconductor layers 1a, and lightly doped source regions 1b, lightly doped drain regions 1c, heavily doped source regions 1d, and heavily doped drain regions 1e in the semiconductor layers 1a.

According to the present exemplary embodiment, relay electrodes 719 are formed on the second layer using the same film as the gate electrodes 3a. As illustrated in FIG. 2, each of the relay electrodes 719 is formed like an island in plan view, to be positioned almost in the center of a side that extends in the X-direction of each of the pixel electrodes 9a. Since the relay electrodes 719 and the gate electrodes 3a are made of the same film, for example, when the gate electrodes 3a are made of the conductive polysilicon film, the relay electrodes 719 are also made of the conductive polysilicon film.

As illustrated in FIG. 4, the above-described TFTs 30 preferably have the LDD structure: however, they may have an offset structure in which impurities are not implanted into the lightly doped source regions 1b and the lightly doped drain regions 1c. Self-aligned-type TFTs having heavily doped source regions and heavily doped drain regions formed by self-matching by implanting impurities with high concentration using the gate electrodes 3a as a mask may be used.

(Laminated Structure: Structure between First Layer and Second Layer, Such as Underlying Interlayer Insulating Film)

The underlying insulating film 12 made of the silicon oxide film, etc. is provided on the scanning lines 11a and under the TFTs 30. The underlying insulating film 12 interlayer-insulates the TFTs 30 from the scanning lines 11a. Also, the underlying insulating film 12 formed on the entire surface of the TFT array substrate 10 prevents the characteristics of the pixel switching TFTs 30 from changing due to the roughness caused by the process of abrading the surface of the TFT array substrate 10, and the dirt that remains after cleaning the TFT array substrate 10.

Contact holes 12cv are formed in the underlying insulating film 12 at both sides of the semiconductor layers 1a, in plan view, in the direction of the channel length of the semiconductor layers 1a that extend along the data lines 6a, to be described later. Corresponding to the contact holes 12cv, concave portions are formed under the gate electrodes 3a laminated above the contact holes 12cv. The gate electrodes 3a are formed to cover the entire region of the contact holes 12cv, such that sidewall portions 3b (the above-described concave portions) integrated with the gate electrodes 3a are provided in the gate electrodes 3a. Thus, as illustrated in FIG. 2, the semiconductor layers 1a of the TFTs 30 are covered from the side in plan view, such that it is possible to reduce or prevent light from being incident on the covered portions.

The sidewall portions 3b are formed to cover the contact holes 12cv, and the lower ends thereof are connected to the scanning lines 11a. Here, the scanning lines 11a are formed in stripes, as described above, such that the gate electrode 3a and the scanning line 11a in a certain row always have the same electric potential in the row.

(Laminated Structure: Structure of Third Layer, such as Storage Capacitors)

Subsequent to the above-described second layer, in the third layer, the storage capacitors 70 are provided. The storage capacitors 70 are formed such that lower electrodes 71, serving as pixel-electric-potential-side capacitor electrodes and being connected to the heavily doped drain regions 1e and the pixel electrodes 9a of the TFTs 30, face the capacitor electrodes 300, serving as fixed-electric-potential-side capacitor electrodes, with dielectric films 75 interposed therebetween. According to the storage capacitors 70, it is possible to significantly improve the potential storage characteristics of the pixel electrodes 9a. As illustrated in FIG. 2, the storage capacitors 70 according to the present exemplary embodiment do not reach light transmission regions almost corresponding to the regions in which the pixel electrodes 9a are formed. That is, since the storage capacitors 70 are accommodated in light shielding regions, the pixel-aperture ratio of the entire electro-optical device remains large, such that it is possible to display brighter images.

Since the storage capacitors 70 are especially important in the present invention, the storage capacitors 70 will be described in more detail later in the sections "Structure of Storage Capacitors" and "Method of Manufacturing Storage Capacitors".

(Laminated Structure: Structure between Second Layer and Third Layer, Such as First Interlayer Insulating Film)

A first interlayer insulating film 41 made of a silicate glass film such as NSG (Non Silicate Glass), PSG (Phosphorus Silicate Glass), BSG (Boron Silicate Glass), BPSG (Boron Phosphorus Silicate Glass), etc., a silicon nitride film, or a silicon oxide film, or preferably NSG, is formed on the TFTs 30 or the gate electrodes 3a, on the relay electrodes 719, and under the storage capacitors 70.

In the first interlayer insulating film 41, contact holes 81 for electrically connecting the heavily doped source regions 1d of the TFTs 30 to the data lines 6a, to be described later, are provided to pass through the second interlayer insulating film 42, to be described later. Also, in the first interlayer insulating film 41, contact holes 83 for electrically connecting the heavily doped drain regions 1e of the TFTs 30 to the lower electrodes 71 that constitute the storage capacitors 70 are formed as open holes. Furthermore, in the first interlayer insulating film 41, contact holes 881 for electrically connecting the lower electrodes 71, serving as the pixel-electric-potential-side capacitor electrodes that constitute the storage capacitors 70, to the relay electrodes 719 are provided. Furthermore, in the first interlayer insulating film 41, contact holes 882 for electrically connecting the relay electrodes 719 to the second relay electrodes 6a2, to be described later, are provided as open holes to pass through the second interlayer insulating film, to be described later.

(Laminated Structure: Structure of Fourth Layer, Such as Data Lines)

Subsequent to the third layer, in the fourth layer, the data lines 6a are provided. As illustrated in FIG. 4, the data lines 6a have a three-layered structure, such as a layer made of aluminum (refer to the reference numeral 41A in FIG. 4), a layer made of titanium nitride (refer to the reference numeral 41TN in FIG. 4), and a layer made of silicon nitride (refer to the reference numeral 401 in FIG. 4) in order from the bottom. The silicon nitride film is patterned with a little large size to cover the aluminum layer and the titan nitride layer thereunder.

Also, in the fourth layer, capacitor wiring line relay layers 6a1 and the second relay electrodes 6a2 are formed of the same film as the data lines 6a. As illustrated in FIG. 3, they are not continuous to the data lines 6a on a plane but are isolated from each other after being patterned in plan view. For example, when attention is paid to the data line 6a positioned on the leftmost side in FIG. 3, the almost quadrangular capacitor wiring line relay layers 6a1 and the almost quadrangular second relay electrode 6a2 whose area is slightly larger than that of the capacitor wiring line relay layer 6a1 are formed on the right side of the data line 6a.

In addition, since the capacitor wiring line relay layers 6a1 and the second relay electrodes 6a2 are formed of the same film as the data lines 6a, they have a three-layered structure such as the layer made of aluminum, the layer made of titan nitride, and the layer made of plasma nitride film, in order from the bottom.

(Laminated Structure: Structure between Third Layer and Fourth Layer Such as Second Interlayer Insulating Film)

The second interlayer insulating film 42 formed of the silicate glass film such as NSG, PSG, BSG, and BPSG, the silicon nitride film or the silicon oxide film, or preferably formed by a chemical vapor deposition (CVD) method using TEOS gas is provided on the storage capacitors 70 and under the data lines 6a. In the second interlayer insulating film 42, the contact holes 81 for electrically connecting the heavily doped source regions 1d of the TFTs 30 to the data lines 6a and contact holes 801 for electrically connecting the capacitor wiring line relay layers 6a1 to the capacitor electrodes 300 that are the upper electrodes of the storage capacitors 70 are provided. Furthermore, in the second interlayer insulating film 42, the contact holes 882 for electrically connecting the second relay electrodes 6a2 to the relay electrodes 719, are formed.

(Laminated Structure: Structure of Fifth Layer Such as Storage Capacitors)

Subsequent to the fourth layer, in the fifth layer, capacitor wiring lines 400 are formed. As illustrated in FIG. 3, the capacitor wiring lines 400 are formed in a matrix to extend in the X and Y-directions in the drawing in plan view. Among the capacitor wiring lines 400, the portions that extend in the Y-direction in the drawing are particularly wider than the data lines 6a in order to cover the data lines 6a. Also, each of the portions that extend in the X-direction in the drawing has a notch in the center of one side of each of the pixel electrodes 9a in order to secure regions in which the third relay electrodes 402 are formed.

In FIG. 3, at the corners of the intersections of the capacitor wiring lines 400 that extend in the X and Y directions, almost triangular portions are provided to cover the corners. Since the almost triangular portions are provided in the capacitor wiring lines 400, it is possible to effectively shield the semiconductor layers 1a of the TFTs 30 from light. That is, the light that would otherwise be incident on the semiconductor layers 1a from the upper side in an inclined direction is reflected by or absorbed into the triangular portions, such that the light does not reach the semiconductor layers 1a. Thus, it is possible to reduce or prevent light leakage current from being generated, thus displaying high quality images without flicker. The capacitor wiring lines 400 extend from the image display region 10a in which the pixel electrodes 9a are arranged to the vicinity thereof to be electrically connected to an electrostatic potential source and to have fixed electric potential.

In the fifth layer, the third relay electrodes 402 are formed of the same film as the capacitor wiring lines 400. The third relay electrodes 402 relay electrical connection between the second relay electrodes 6a2 and the pixel electrodes 9a through contact holes 804 and 89, to be described later. The capacitor wiring lines 400 and the third relay electrodes 402 are not continuous with each other on a plane but are isolated from each other after being pattrerned.

On the other hand, the capacitor wiring lines 400 and the third relay electrodes 402 have a two-layered structure, such as the layer made of aluminum as a lower layer and the layer made of titanium nitride as an upper layer.

(Laminated Structure: Structure between Fourth Layer and Fifth Layer, Such as Third Interlayer Insulating Film)

The third interlayer insulating film 43 is formed on the data lines 6a and under the capacitor wiring lines 400. In the third interlayer insulating film 43, contact holes 803 for electrically connecting the capacitor wiring lines 400 to the capacitor wiring line relay layers 6a1 and contact holes 804 for electrically connecting the third relay electrodes 402 to the second relay electrodes 6a2 are formed as open holes.

(Laminated Structure: Structure of Sixth Layer and Structure between Fifth Layer and Sixth Layer, Such as Pixel Electrodes)

Finally, in the sixth layer, as described above, the pixel electrodes 9a are formed in a matrix. The alignment film 16 is formed on the pixel electrodes 9a. The fourth interlayer insulating film 44 is formed under the pixel electrodes 9a. In the fourth interlayer insulating film 44, contact holes 89 for electrically connecting the pixel electrodes 9a to the third relay electrodes 402, are formed as open holes. The pixel electrodes 9a and the TFTs 30 are electrically connected to each other through the contact holes 89, the third relay layer 402, the contact holes 804, the second relay layers 6a2, the contact holes 882, the relay electrodes 719, the contact holes 881, the lower electrodes 71, and the contact holes 83.

(Structure of Storage Capacitors)

Figure 5:
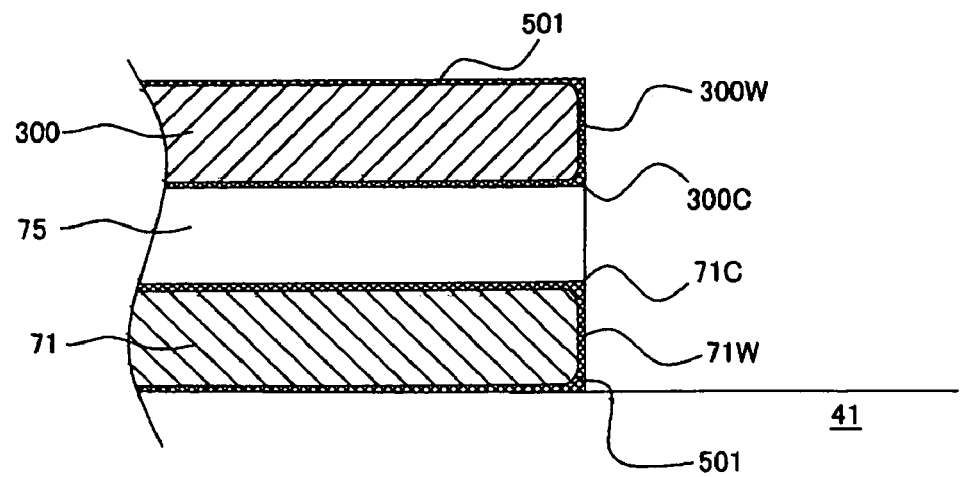
FIG. 5 is an enlarged sectional view illustrating the end part of the storage capacitor in the circle denoted by the reference numeral C of FIG. 4.
Figure 6:
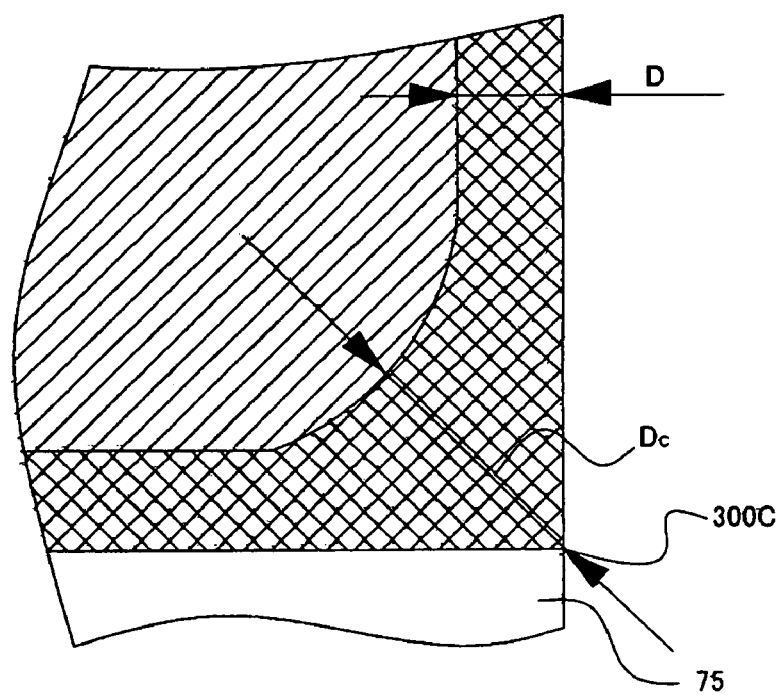
FIG. 6 is an enlarged sectional view illustrating the portion denoted by the reference numeral 300C of FIG. 5.
Figure 7:
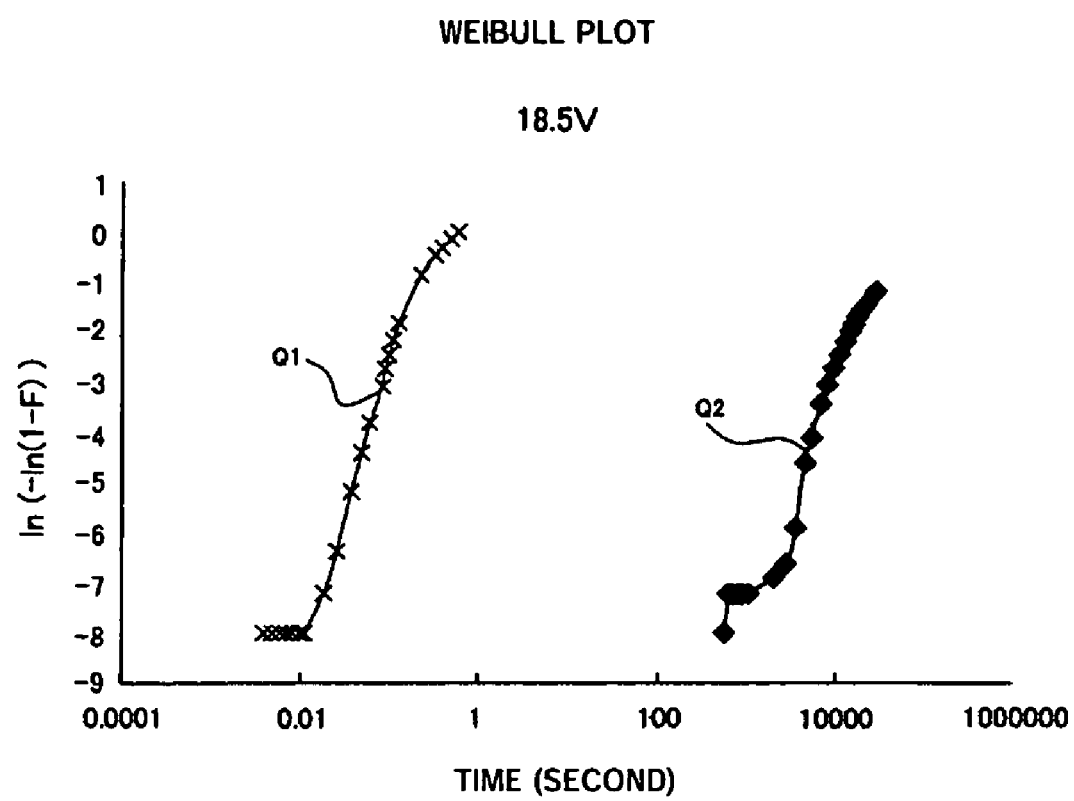
FIG. 7 is a graph illustrating the breakdown-voltage performance of the storage capacitor when an oxidation film is included and the breakdown-voltage performance of the storage capacitor when the oxidation film is not included.

In the electro-optical device according to the present exemplary embodiment having the above-described structure, the structure of the storage capacitors 70, and in particular, the structures of the capacitor electrodes 300 and the lower electrodes 71 that constitute the storage capacitors 70 is characterized. The structures will now be described in detail with reference to the above-described drawings and FIGS. 5 to 7. FIG. 5 is a schematic that shows an enlarged sectional view illustrating the vicinity of the end part of the storage capacitor 70 in the circle denoted by the reference numeral C of FIG. 4. FIG. 6 is a schematic that shows an enlarged sectional view illustrating the portion denoted by the reference numeral 300C of FIG. 5. FIG. 7 is a graph illustrating the breakdown-voltage performance of the storage capacitor when the capacitor electrodes 300 and the lower electrodes 71 are oxidized, and the breakdown-voltage performance of the storage capacitor when the capacitor electrodes 300 and the lower electrodes 71 are not oxidized.

First, the storage capacitors 70 according to the present exemplary embodiment comprise the lower electrodes 71, the capacitor electrodes 300, and the dielectric films 75. The lower electrodes 71 are made of the conductive polysilicon film and function as the pixel-electric-potential-side capacitor electrodes. The lower electrodes 71 have the function of relay-connecting the pixel electrodes 9a to the heavily doped drain regions 1e of the TFTs 30, as well as the function of the pixel-electric-potential-side capacitor electrodes. Incidentally, the relay connection described herein is performed through the relay electrodes 719. On the other hand, the capacitor electrodes 300 are made of the conductive polysilicon film, and function as the fixed-electric-potential-side capacitor electrodes of the storage capacitors 70. According to the present exemplary embodiment, in order to make the capacitor electrodes 300 have the fixed electric potential, the capacitor electrodes 300 must be electrically connected to the capacitor wiring lines 400 having the fixed electric potential. The dielectric films 75 are composed of silicon oxide film having a thickness of about 5 to 200 nm, such as a HTO (High Temperature Oxide) film and a LTO (Low Temperature Oxide) film. In order to increase the capacitance, the storage capacitors 70, the dielectric films 75 are preferably thinner as long as it is possible to achieve sufficient reliability. According to the present exemplary embodiment, the dielectric films 75 have a single-layered structure. However, if necessary, the dielectric films 75 may have a two-layered structure, such as a silicon nitride film and a silicon oxide film, or a structure with three or more layers.

In the storage capacitors 70, as illustrated in FIGS. 2 and 3 or FIG. 4, the capacitor electrodes 300, the lower electrodes 71, and the dielectric films 75 are formed to have the same shape in plan view. Thus, the end face 300W of the capacitor electrode 300 and the end face 71W of the lower electrode 71 are placed on an imaginary plane (not shown) perpendicularly to the TFT array substrate 10. In other words, the end faces 300W and 71W are aligned as illustrated in FIGS. 5 and 6. Thus, it is possible to prevent the portions in which electrodes on one side do not face electrodes on the other side, that is, the surplus portions that do not function as the storage capacitors, from undesirably occupying the restricted area on the TFT array substrate 10. Also, since the capacitor electrodes 300 and both relay electrodes 71 face each other, it is possible to address or achieve reduction and minuteness in size of the electro-optical device and to reduce or prevent the capacitance of the storage capacitors from being undesirably reduced.

According to the present exemplary embodiment, in particular, the surfaces of the capacitor electrode 300 and the lower electrode 71 are oxidized as illustrated in FIGS. 5 and 6 (not shown in FIG. 4) to thus form oxidation films 501. The oxidation films 501 are formed on the top and bottom surfaces of the capacitor electrode 300 as well as on the end face 300W of the capacitor electrode 300. The oxidation films 501 are formed on the top and bottom surfaces of the lower electrode 71 as well as on the end face 71W of the lower electrode 71. The bottom surface of the capacitor electrode 300 is oxidized because oxygen is supplied to the bottom surface of the capacitor electrode 300 through the dielectric film 75. The bottom surface of the lower electrode 71 is oxidized because oxygen is supplied to the bottom surface of the lower electrode 71 through the first interlayer insulating film 41.

According to the present exemplary embodiment, in particular, at the edge portion 300C included in the end face 300W, as illustrated in FIG. 6, (½) of an almost semi-circular region ((⅛) of an almost semi-spherical region based on the edge in three dimensions) is the oxidation film 501. This is because oxidation is isotropically performed on the corresponding portion from the end face 300W on the right side of the drawing and from the bottom surface in the drawing. The thickness of the oxidation film 501 at the edge portion 300C is larger than that in the other portions. According to the present exemplary embodiment, the thickness of the oxidation film 501 at the edge portion 300C refers to the portion denoted by the reference numeral $D_C$ illustrated in FIG. 6. As described above, there exists a difference between the thickness $D_C$ of the oxidation film 501 at the edge 300C and the thickness D of the oxidation film 501 in the other portions, because the edge portion 300C has a plane having a plane orientation in which oxidation can be more easily performed, or because chemical reactions more easily occur, that is, an oxidant more actively operates in the portion having a sharp tip, like the edge portion 300C. The above-described effect is true of the edge 71C of the lower electrode 71. Incidentally, the thickness D of the oxidation film 501 according to the present exemplary embodiment satisfies the condition $1.5 \text{ [nm]} \leq D \leq 30 \text{ [nm]}$.

The electro-optical device according to the present exemplary embodiment includes such oxidation films 501 to thus obtain the following effects. That is, it is possible to reduce or prevent the capacitor electrodes 300 and the lower electrodes 71 from being short circuited due to the oxidation films 501. In particular, since the oxidation films 501 are also formed on the end faces 300W and 71W and the edge portions 300C and 71C, it is possible to significantly improve the breakdown-voltage performance of the storage capacitors 70.

The above-described matters can be actually confirmed by FIG. 7. FIG. 7 is a graph illustrating the breakdown-voltage performance of the storage capacitor 70 when the oxidation film 501 is included, and the breakdown-voltage performance of the storage capacitor 70 when the oxidation film 501 is not included. More specifically, FIG. 7 is a weibull plot illustrating, when a uniform voltage 18.5 [V] is continuously applied to the storage capacitor 70 (see the reference numeral Q2 in the drawing) with the oxidation film 501 and to the storage capacitor (see the reference numeral Q1 in the drawing) without the oxidation film 501, how the failure rate of the storage capacitor increases. The horizontal axis of FIG. 7 represents time t and the vertical axis of FIG. 7 represents $\ln(-\ln(1-F(t)))$ expressed by a failure distribution function (an unreliability function) F(t). The function Fkt) is a failure distribution function of a weibull distribution and is represented as $F(t)=1-[\exp\{-(t-Y)/\eta\}m]$ (m is a shape parameter, T is a scale parameter, and Y is a position parameter). The expression $\ln(-\ln(1-F(t)))$ related to the vertical axis can be obtained by setting Y=0, by performing proper transpositions, and by taking the logarithm twice on both sides. It is noted from FIG. 7 that the breakdown-voltage performance of the storage capacitor 70 (see the reference numeral Q2) with the oxidation film 501 is better than the breakdown-voltage performance of the storage capacitor (see the reference numeral Q1) without the oxidation film 501 considering that, with respect to the storage capacitor 70 with the oxidation film 501, the graph starts at a time later than the time at which the graph starts with respect to the storage capacitor without the oxidation film 501.

As described above, in the present exemplary embodiment, since the oxidation films 501 are formed on the capacitor electrodes 300 and the lower electrodes 71 that constitute the storage capacitors 70, the breakdown-voltage performance of the storage capacitors 70 is enhanced and/or is improved. Therefore, since the storage capacitors 70 according to the present exemplary embodiment can sufficiently display the expected performance of enhancing and/or improving the potential storage characteristic of the pixel electrodes 9a, it is possible to provide an electro-optical device capable of displaying high quality images and of more stably operating.

Figure 8:
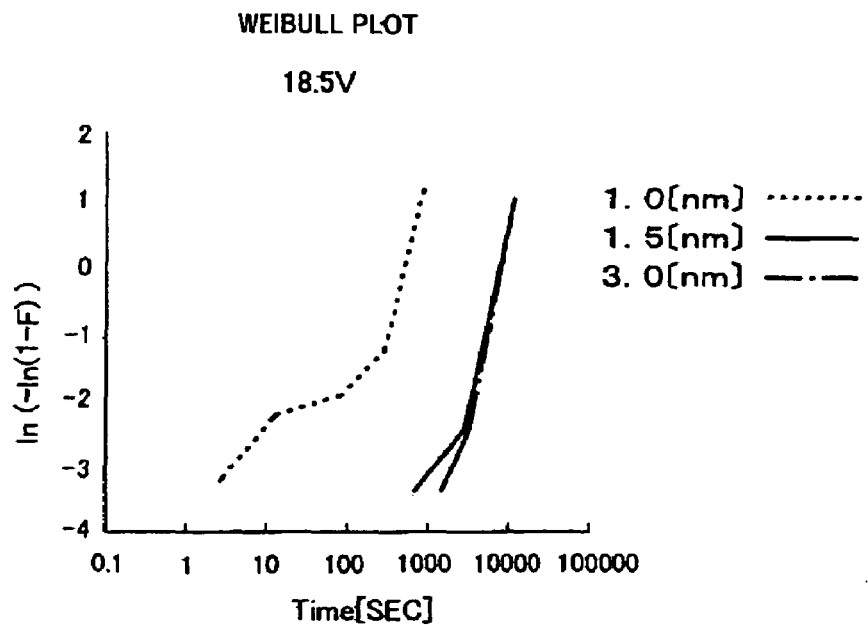
FIG. 8 is a graph illustrating the influence of the thickness of the oxidation film on the improvement of the breakdown-voltage performance of the storage capacitor.

According to the present exemplary embodiment, since the thickness D of the oxidation film 501 is properly determined, it is possible to obtain the following effects. This will be described with reference to FIG. 8. FIG. 8 is a graph illustrating the influence of the thickness of the oxidation film on the improvement of the breakdown-voltage performance of the storage capacitor.

More specifically, FIG. 8 is a weibull plot obtained when a uniform voltage of 18.5 [V] is continuously applied to the storage capacitor 70, like in FIG. 7, in which the thickness D of the oxidation film 501 is changed as a parameter (1, 1.5, and 3 [nm]). As is apparent from FIG. 8, a remarkable difference exists between the case in which the thickness D of the oxidation film 501 is 1 [nm] and the cases in which the thickness D of the oxidation film 501 is 1.5 [nm] and 2 [nm]. That is, whereas the graph starts at a relatively early stage in the former, the graph starts at a relatively late state in the latter. Thus, it is considered that the increase and decrease of the thickness D of the oxidation film 501 greatly affects the enhancement and/or improvement of the breakdown-voltage performance of the storage capacitor 70 between the case in which the thickness D is 1 [nm] and the case in which the thickness D is 1.5 [nm]. When the thickness D of the oxidation film 501 is greater than 1.5 [nm], the enhancement and/or improvement of the breakdown-voltage performance of the storage capacitor 70 remains stable thereafter. As a result, the thickness D of the oxidation film 501 is preferably no less than 1.5 [nm].

Although not shown in the drawings, it does not mean that the thickness D of the oxidation film 501 is preferably as large as possible. That is, when the thickness D of the oxidation film 501 is too large, in the thermal oxidation process of forming the oxidation film 501, the semiconductor layer 1a of the TFT 30 is also oxidized to thus decrease the switching ON current of the TFT 30. Thus, the thickness D of the oxidation film 501 is preferably no more than a certain level, more specifically, no more than 30 [nm].

As described above, according to the present exemplary embodiment, when the thickness D of the oxidation film 501 satisfies the condition 1.5 [nm]$\leq T \leq$30 [nm], it is possible to obtain the storage capacitors 70 with sufficient breakdown-voltage performance and to obtain the TFTs 30 that operate satisfactorily. Also, in FIG. 5, considering that the portions that mainly control the breakdown-voltage performance of the storage capacitor 70 are the edge portions 300C and 71C, it is assumed that it is possible to obtain the above-described effects when oxidation films are sufficiently formed on those portions. Thus, the condition 1.5 [nm]$\leq D \leq$30 [nm] can be changed to 1.5 [nm]$\leq D_C \leq$30 [nm], if necessary. In this case, if a local oxidation process can be performed, the oxidation process can be performed only on the edge portions 300C and 71C to satisfy the condition related to the thickness $D_C$ (see FIGS. 9, 10, and 12). Such a form is also within the scope of the present invention.

Figure 9:
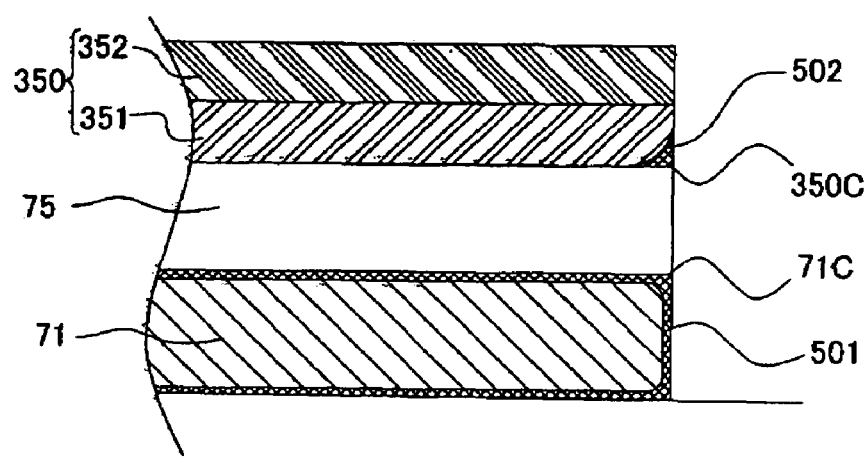
FIG. 9 is a sectional view illustrating the storage capacitor having a capacitor electrode (including a tungsten silicide layer) according to an exemplary aspect different from the exemplary aspect of FIG. 5 but with the same or similar purpose as FIG. 5.
Figure 10:
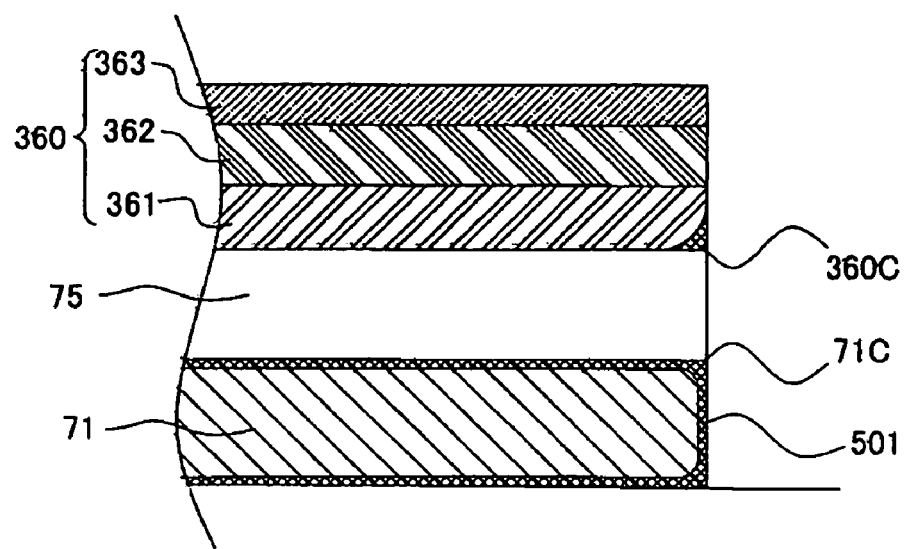
FIG. 10 is a sectional view illustrating the storage capacitor having a capacitor electrode (including the tungsten silicide layer and a silicon nitride layer) according to an exemplary aspect different from the exemplary aspect of FIG. 5 but with the same or similar purpose as FIG. 5.
Figure 11:
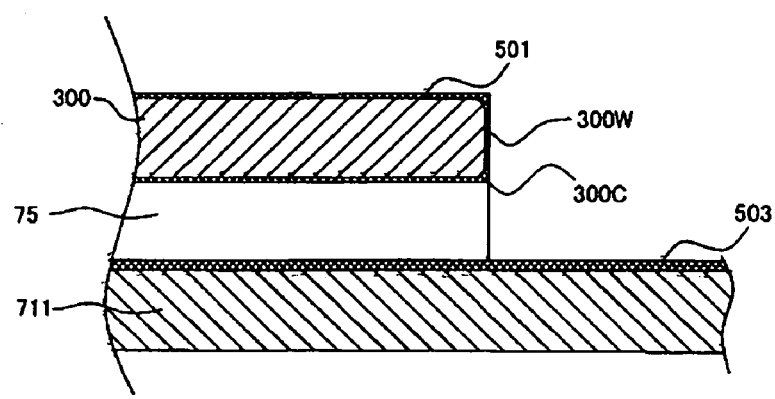
FIG. 11 is a sectional view illustrating the storage capacitor having a lower electrode (including a lower electrode having a relatively large area) according to an exemplary aspect different from the exemplary aspect of FIG. 5 but with the same or similar purpose as FIG. 5.
Figure 12:
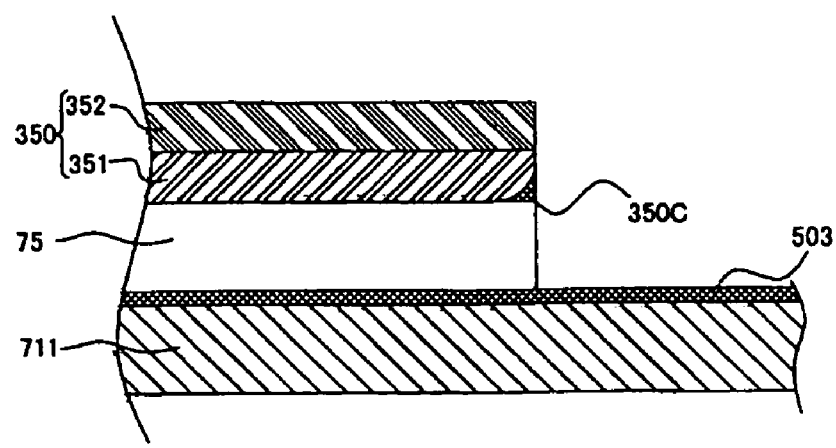
FIG. 12 is a sectional view illustrating the storage capacitor having a capacitor electrode (including the tungsten silicide layer) according to an exemplary aspect different from the exemplary aspect of FIG. 11 but with the same or similar purpose as FIG. 11.
Figure 13:
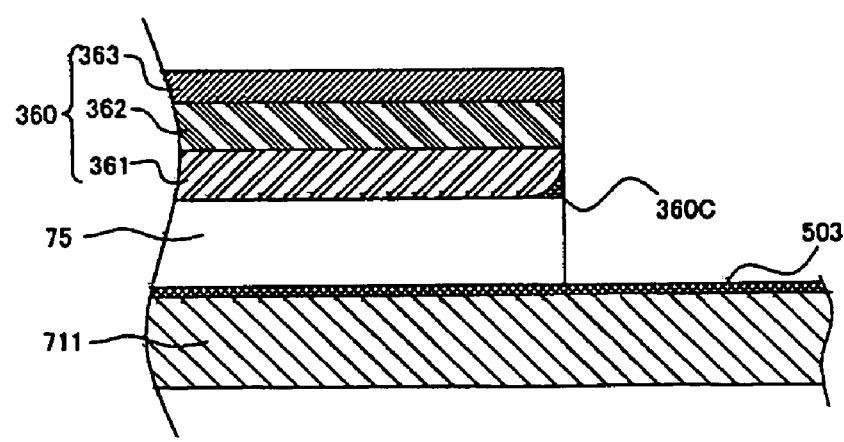
FIG. 13 is a sectional view illustrating the storage capacitor having a capacitor electrode (including the tungsten silicide layer and the silicon nitride layer) according to an exemplary aspect different from the exemplary aspect of FIG. 11 but with the same or similar purpose as FIG. 11.

According to the present exemplary embodiment, a description is made of the storage capacitors 70 which comprise the capacitor electrodes 300 and the lower electrodes 71 made of the conductive polysilicon film, and the dielectric films 75 made of the silicon oxide film or the silicon nitride film. However, the present invention is not limited to the above-described exemplary embodiment. Various exemplary modifications will now be described with reference to FIGS. 9 to 13. FIGS. 9 and 10 are schematics that show sectional views illustrating storage capacitors having capacitor electrodes according to aspects different from the aspect of FIG. 5 but with the same or similar purpose as FIG. 5. FIG. 11 is a sectional view illustrating a storage capacitor having a lower electrode according to an aspect different from the aspect of FIG. 5 but with the same purpose as FIG. 5. FIGS. 12 and 13 are sectional views illustrating storage capacitors having capacitor electrodes according to aspects different from the aspect of FIG. 11 but with the same or similar purpose as FIG. 11.

First, as to the dielectric film 75, the silicon nitride film may be used instead of or in addition to the silicon oxide film ("in addition" means that the dielectric film 75 may have the two-layered structure such as the silicon oxide film and the silicon nitride film as described above). Thus, the dielectric film 75 includes the silicon nitride film having a relatively large dielectric constant, so that it is possible to increase the capacitance of the storage capacitor 70. Thus, it is possible to make the dielectric film 75 thinner compared to the case in which the dielectric film 75 is made of only the silicon oxide film, so that it is possible to address or achieve reduction and minuteness in size of the electro-optical device, and to reduce the manufacturing time of the electro-optical device in some cases. However, when the thickness of the dielectric film 75 is reduced, the distance between the capacitor electrode 300 and the lower electrode 71 is reduced, thus there is a fear of deterioration of the breakdown-voltage performance of the storage capacitor 70. However, according to the present invention, as described above, since the capacitor electrodes 300 and the lower electrodes 71 are oxidized, such a fear is almost dispelled. That is, since the dielectric films 75 include silicon nitride film, the breakdown-voltage performance of the storage capacitors 70 is hardly decreased even if the thickness of the dielectric film 75 is reduced as small as possible.

Next, as the capacitor electrode, tungsten silicide (WSi) may be used instead of the conductive polysilicon film or in addition to the conductive polysilicon film, as illustrated in FIG. 9. In FIG. 9, a capacitor electrode 350 has a conductive polysilicon film 351 thereunder and a WSi film 352 thereon. Thus, the capacitor electrode 300 is arranged to cover the semiconductor layer 1a (see FIGS. 2 and 3), and includes the WSi film 352 having a relatively excellent light absorbing performance to thus reduce or prevent light from being incident on the semiconductor layer 1a or the channel region 1a' thereof. That is, the generation of light leakage current in the semiconductor layer I can be reduced or prevented. As a result, flicker can be reduced or prevented from being generated on images. Even in such a case, as illustrated in FIG. 9, it is possible to oxidize the capacitor electrode 350 to thus form an oxidation film 502. The oxidation film 502 in FIG. 9 is formed only on the edge portion 350C of the capacitor electrode 350.

Thus, according to the structure of FIG. 9, the storage capacitor 70 functions as a light shielding film and also has an excellent breakdown-voltage performance, so that it is possible to realize two functions by one structure. As a result, it is possible to simplify the structure of the electro-optical device, and to address or achieve reduction and minuteness in size of the electro-optical device.

According to the structure related to FIG. 9, when the thermal oxidation process is performed in order to obtain the oxidation film 502, or the oxidation film 501 in the lower electrode 71, the WSi film 352 may be significantly oxidized. Thus, in order to prevent the WSi film 362 from being oxidized, as illustrated in FIG. 10, a silicon nitride film 363 may be provided on the WSi film 362 in addition to the conductive polysilicon film 361 and the WSi film 362. It is possible to prevent the WSi film 362 from being oxidized due to the presence of the silicon nitride film 363. CoSi and TiSi as well as WSi are used as a material for effectively shielding the semiconductor layers 1a from light. In general, elemental metal, an alloy, metal silicide, polysilicide including at least one high-melting-point metal such as Ti, Cr, W, Ta, and Mo, and a laminate thereof may be used. Furthermore, the lower electrodes 71 as well as the capacitor electrodes 300 may adopt the same structure described above with respect to the capacitor electrodes 300, or may be formed of a single-layered film or a multi-layered film including metal or an alloy.

According to the above exemplary embodiment, the shapes of the capacitor electrode 300 and the lower electrode 71 are the same in plan view. However, the present invention is not limited to this exemplary embodiment. For example, as illustrated in FIG. 11, the storage capacitor may be formed such that the area of a lower electrode 711 on the lower layer can be larger and that the area of the capacitor electrode 300 on the upper layer can be smaller. Even in this case, as long as the end face 300W or the edge portion 300C of the capacitor electrode 300 exists, defect such as damage of the insulation property caused by electrostatic focusing is generated at the edge portion 300C. However, in FIG. 1, the oxidation film 501 is formed on the capacitor electrode 300 like in FIG. 5, and the oxidation film 503 is formed on the lower electrode 711. Therefore, the breakdown-voltage performance of the storage capacitor is enhanced or improved. According to the structure related to FIG. 11, as illustrated in FIGS. 12 and 13, it is needless to mention that the storage capacitor may be formed with the same purpose as those illustrated in FIGS. 9 and 10. The oxidation film in FIGS. 12 and 13 is formed only on the edge portion 350C of the capacitor electrode 350 and the edge portion 360C of the capacitor electrode 360.

(Method of Manufacturing Storage Capacitor)

The oxidation film 501 as described above is manufactured as illustrated in FIGS. 14 and 15.

FIGS. 14 and 15 are schematics that show sectional views illustrating, in order, the manufacturing processes of the electro-optical device according to the present exemplary embodiment shown in FIG. 4. Hereinafter, the manufacturing processes of the storage capacitor 70 particularly related to the present invention will only be described. In FIGS. 14 and 15, the structure on the side of the counter substrate 20 is omitted.

First, in the laminated structure where the first interlayer insulating film 41 and the contact holes 83 and 881 are formed by a well-known method on the TFT array substrate 10, as illustrated in process (1) of FIG. 14, an amorphous silicon film is formed on the first interlayer insulating film 41 in a low temperature atmosphere of about 450° C. to 550° C., preferably about 500° C., by a low pressure CVD method (for example, a CVD method with a pressure of about 20 to 40 Pa) using monosilane gas and disilane gas with a flow rate of about 400 to 600 cc/min. At this time, P (Phosphorus) ions are introduced into the atmosphere, such that the amorphous silicon film is doped with the P ions. A thermal process is performed in a nitrogen atmosphere at a temperature of about 600 to 700° C. for about 1 to 10 hours, preferably for 4 to 6 hours, such that a p-Si (polysilicon) film is solid-phase grown to a thickness of about 50 to 200 nm, preferably about 100 nm. As a method for solid-phase growing the polysilicon film, a firing process using rapid thermal anneal (RTA) or a laser firing process using an excimer laser may be used. The polysilicon film corresponds to a precursor film 71K which will become the lower electrode 71.

Next, as illustrated in process (2) of FIG. 14, a precursor film 75K of the dielectric film 75 is formed on the precursor film 71K. The precursor film 75K is thermally oxidized at a temperature of 900 to 1300° C., preferably about 1,000° C., to thus form a lower insulating film. Then, if necessary, an upper insulating film is formed by a low pressure CVD method, such that a single-layered or a multi-layered high-temperature silicon oxide film (a HTO film) or silicon nitride film is formed. Next, as illustrated in process (3) of FIG. 14, a precursor film 300K which will become the capacitor electrode 300 is formed like the precursor film 71K.

Next, as illustrated in process (4) of FIG. 15, the precursor film 71K, the precursor film 75K, and the precursor film 300K are simultaneously patterned (by photolithography and etching). Thus, the storage capacitors 70 comprising the lower electrode 71 obtained by patterning the precursor film 71K, the dielectric film 75 obtained by patterning the precursor film 75K, and the capacitor electrode 300 obtained by patterning the precursor film 300K, are formed. As described above, when the precursor film 71K, the precursor film 75K, and the precursor film 300K are simultaneously patterned, it is possible to simplify the manufacturing processes compared to the case in which the capacitor electrode 300, the dielectric film 75, and the lower electrode 71 are formed separately. Also, when such patterning is performed, the end face 300W of the capacitor electrode 300, the end face 75W of the dielectric film 75, and the end face 71W of the lower electrode 71 are placed on the same plane. In other words, in the patterning process, the capacitor electrode 300, the lower electrode 71, and the dielectric film 75 are patterned to have the same planar shape in plan view.

Next, as illustrated in process (5) of FIG. 15, the surfaces of the capacitor electrode 300 and the lower electrode 71 formed as described above are preferably oxidized by a thermal oxidation process (see FIGS. 5 and 6). More specifically, for example, the surfaces of the capacitor electrode 300 and the lower electrode 71 are thermally oxidized in a longitudinal-type thermal diffusion furnace in an atmosphere where the concentration of oxygen ($O_2$) is 2% at a temperature of 850 [° C.] for 5 minutes. Thus, it is possible to properly form the oxidation film 501 that satisfies the condition 1.5 [nm]≦D≦30 [nm], wherein D is the thickness of the oxidation film. In process (5) of FIG. 15, arrows schematically illustrate that the oxidation process is performed.

According to the present exemplary embodiment, in particular, as illustrated in FIG. 16 with the same purpose as FIG. 5, a remnant X may reside around the end face 300W or the end face 71W by performing an etching process during the patterning process. The remnant X in FIG. 16 and a remnant Y, to be described later, are exaggerated for clarity. When the remnant X remains, according to the present exemplary embodiment, in particular, since the end faces 300W and 71W exist, the breakdown-voltage performance of the capacitor electrode 300 and the lower electrode 71 deteriorates and, in some cases, the capacitor electrode 300 and the lower electrode 71 may be short circuited. As illustrated in FIG. 16, when the remnant Y, which has a sharp tip, is attached to the end face 71W, electrostatic focusing may easily occur in the sharp portion, thus deteriorating the breakdown-voltage performance of the storage capacitor 70. According to the present exemplary embodiment, after performing the patterning process, the thermal oxidation process is performed as described above. In the thermal oxidation process, the remnants X and Y are oxidized as illustrated in FIG. 16, so that oxidation films 501X and 501Y are formed on the surfaces of remnants X and Y. Thus, according to the manufacturing method of the present exemplary embodiment, no matter which shape the remnants X and Y have, it is possible to prevent the remnants from affecting the capacitor electrode 300 and the lower electrode 71.

The above-described oxygen concentration and oxidation temperature are determined to satisfy the following conditions. First, the oxygen concentration is preferably no less than 2 [%]. Thus, it is possible to more reliably and rapidly thermally oxidize the capacitor electrode 300 and the lower electrode 71. On the other hand, the oxidation temperature is preferably no less than 350 [° C.]. Thus, it is possible to more reliably and rapidly oxidize the capacitor electrode 300 and the lower electrode 71. During the thermal oxidation process, the atmosphere temperature is preferably as high as possible since the atmosphere temperature significantly contributes to the speed at which the oxidation film 501 is formed. The oxidation temperature is preferably no less than 800 [° C.], and more preferably about 850 [° C.], as described above.

As described above, the storage capacitor 70 according to the present exemplary embodiment composed of the capacitor electrode 300 and the lower electrode 71 including the oxidation films 501 is completed.

According to exemplary embodiments of the present invention, other than the above-described manufacturing method, the following manufacturing method can be adopted. That is, according to the above-described manufacturing method, after patterning the precursor film 300K, etc., the thermal oxidation process is immediately performed. However, according to exemplary embodiments of the present invention, instead of this, for example, as illustrated in process (6) of FIG. 15, after performing the patterning process to thus form the storage capacitor 70, and forming the second interlayer insulating film 42 on the storage capacitor 70, the thermal oxidation process may be performed. In this case, the thermal oxidation is not performed in process (5). Thus, it is considered that the arrows do not exist in process (5). At this time, more specifically, the thermal oxidation is preferably performed in the longitudinal-type thermal diffusion furnace in an atmosphere where the oxygen concentration is 2% at a temperature of 950 [° C.] for 20 minutes. According to such a method, it is possible to simultaneously perform the process of firing the second interlayer insulating film 42 after forming the second interlayer insulating film 42 and the process of oxidizing the capacitor electrode 300 and the lower electrode 71 that constitute the storage capacitor 70, so that it is possible to simplify the manufacturing processes of the electro-optical device, and to rapidly manufacture the electro-optical device compared with the case in which both processes are separately performed. Also, when the firing process and the oxidation process are simultaneously performed, the processes are preferably performed in an atmosphere where a proper amount of oxygen gas that satisfies the above-described oxygen concentration is added to nitrogen gas.

According to exemplary embodiments of the present invention, the thermal oxidation process may be performed after forming the second interlayer insulating film 42 and, furthermore, after forming the data lines 6a, the capacitor wiring line relay electrodes 6a1, and the second relay electrodes 6a2. In this case, in particular, as described above, the thermal oxidation process is performed at a temperature no more than the lowest melting point ("of the layer 41A made of aluminum" in the present embodiment) among the melting points of the respective layers that constitute the data lines 6a. Thus, it is possible to prevent the data lines 6a from being melted.

Furthermore, according to embodiments of the present invention, the thermal oxidation process may be performed at any point of time after forming the data lines 6a, that is, after forming the third interlayer insulating film on the data lines 6a and, furthermore, after forming the capacitor wiring lines 400 on the third interlayer insulating film 43. In this case, however, the melting points of the data lines 6a, the capacitor wiring lines 400, and the pixel electrodes 9a matter. It is needless to mention that it is necessary to consider the oxidation temperature as described above so that the respective components are not melted.

[Entire Structure of Electro-Optical Device]

Figure 17:
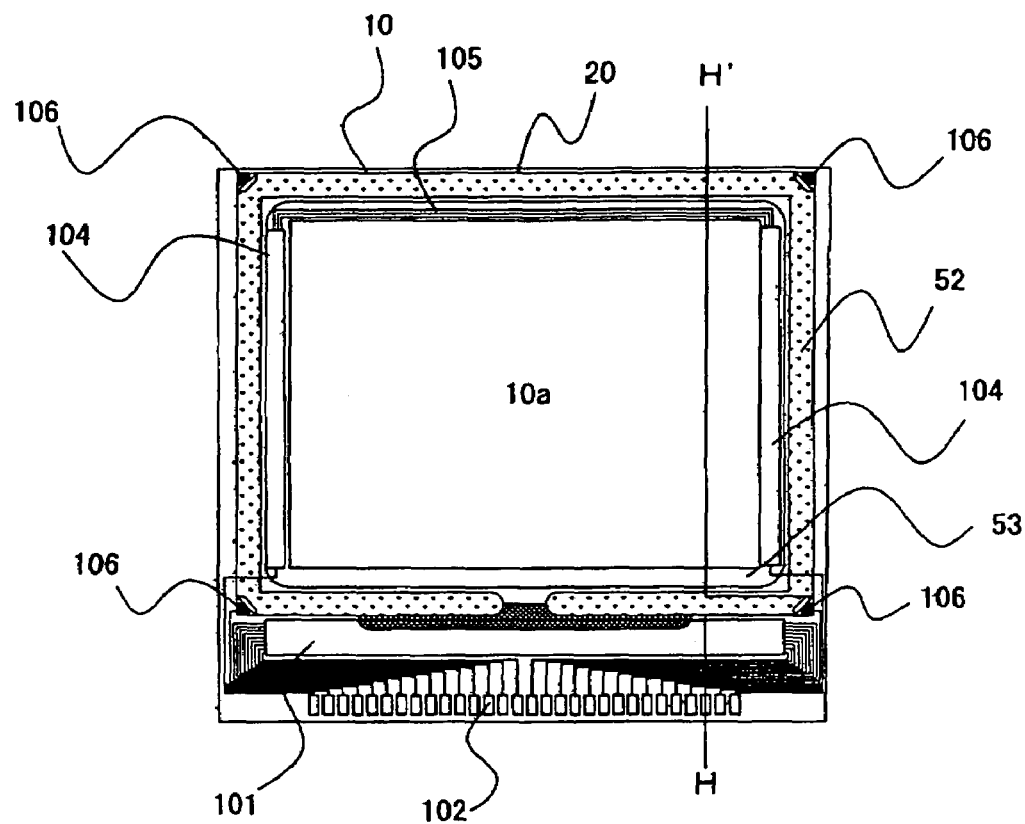
FIG. 17 is a schematic that shows an electro-optical device, in which a TFT array substrate, together with the respective components formed on the TFT array substrate, is seen from a counter substrate.
Figure 18:
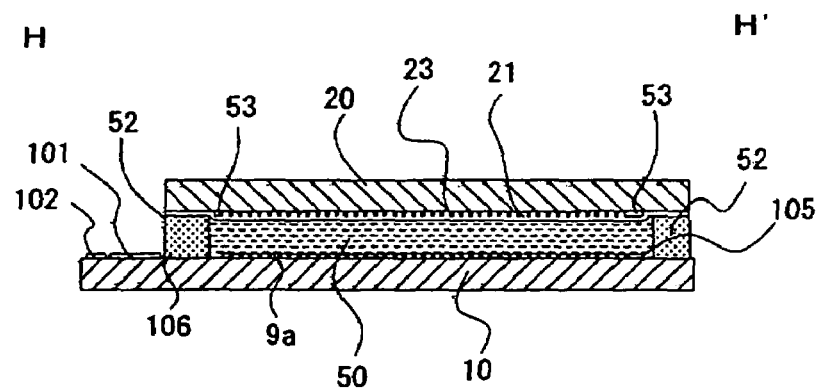
FIG. 18 is a sectional view taken along the line H-H' of FIG. 17.

The entire structure of the electro-optical device according to the present exemplary embodiment will now be described with reference to FIGS. 17 and 18. FIG. 17 is a plan view of the electro-optical device, in which the TFT array substrate, together with the respective components formed on the TFT array substrate, is seen from the counter substrate. FIG. 18 is a sectional view taken along the line H-H' of FIG. 17. A liquid crystal device with a built-in driving circuit TFT active-matrix-driving mode, which is one example of the electro-optical device, is taken as an example.

In FIGS. 17 and 18, according to the electro-optical device of the present exemplary embodiment, the TFT array substrate 10 and the counter substrate 20 are arranged to face each other. The liquid crystal layer 50 is sealed between the TFT array substrate 10 and the counter substrate 20. The TFT array substrate 10 and the counter substrate 20 are attached to each other by the sealing material 52 provided in the sealing region around the image display region 10a.

The sealing material 52 for attaching the two substrates to each other is made of UV-curable resin or thermo-setting resin. The sealing material 52 is hardened by radiating UV rays thereonto and heating the TFT array substrate 10, after being coated into the TFT array substrate 10 in the manufacturing processes. Gap materials such as glass fibers or glass beads for making the TFT array substrate 10 and the counter substrate 20 separated from each other by a predetermined distance (a gap between the TFT array substrate 10 and the counter substrate 20) are scattered in the sealing material 52. The electro-optical device according to the present invention is used for a light valve of a projector and is suitable for displaying small and enlarged images.

A frame-shaped light shielding film 53 that defines the frame region of the image display region 10a is provided at the side of the counter substrate 20 together with the sealing material 52 which is arranged inside the sealing region. Part or all of the frame-shaped light shielding film 53 may be provided at the side of the TFT array substrate 10 as a built-in light shielding film. In a peripheral region beyond the frame-shaped light shielding film 53, in the region outside the sealing region in which the sealing material 52 is arranged, in particular, a data line-driving circuit 101 and external circuit connection terminals 102 are provided along one side of the TFT array substrate 10. Scanning line-driving circuits 104 are provided along two sides adjacent to the one side to be covered with the frame-shaped light shielding film 53. Furthermore, a plurality of wiring lines 105 are provided along the remaining one side of the TFT array substrate 10 to be covered with the frame-shaped light shielding film 53 in order to connect the two scanning line-driving circuits 104 provided on both sides of the image display region 10a.

Upper and lower connecting materials 106 that function as upper and lower connecting terminals between the two substrates are arranged at four corners of the counter substrate 20. On the other hand, the upper and lower connecting terminals are provided in the TFT array substrate 10 in the regions facing the corners. Thus, the TFT array substrate 10 and the counter substrate 20 can be electrically connected to each other.

In FIG. 18, on the TFT array substrate 10, an alignment film is formed on the pixel electrodes 9a after the wiring lines such as the pixel switching TFTs, the scanning lines, and the data lines are formed. On the other hand, on the counter substrate 20, other than the counter electrodes 21, a light shielding film 23 in a matrix or in strips, and an alignment film on the uppermost layer are formed. The liquid crystal layer 50 is made of, for example, liquid crystal obtained by mixing one kind or various kinds of nematic liquid crystal and has a predetermined alignment state between the pair of alignment films.

On the TFT array substrate 10 illustrated in FIGS. 17 and 18, in addition to the data line driving circuit 101 and the scanning line driving circuits 104, sampling circuits for sampling image signals on image signal lines to thus supply the image signals to the data lines, precharge circuits for supplying precharge signals of a predetermined voltage level to the plurality of data lines prior to the image signals, and test circuits for testing the quality and defects of the electro-optical device during the manufacturing or on shipping may be formed.

(Electronic Apparatus)

Figure 19:
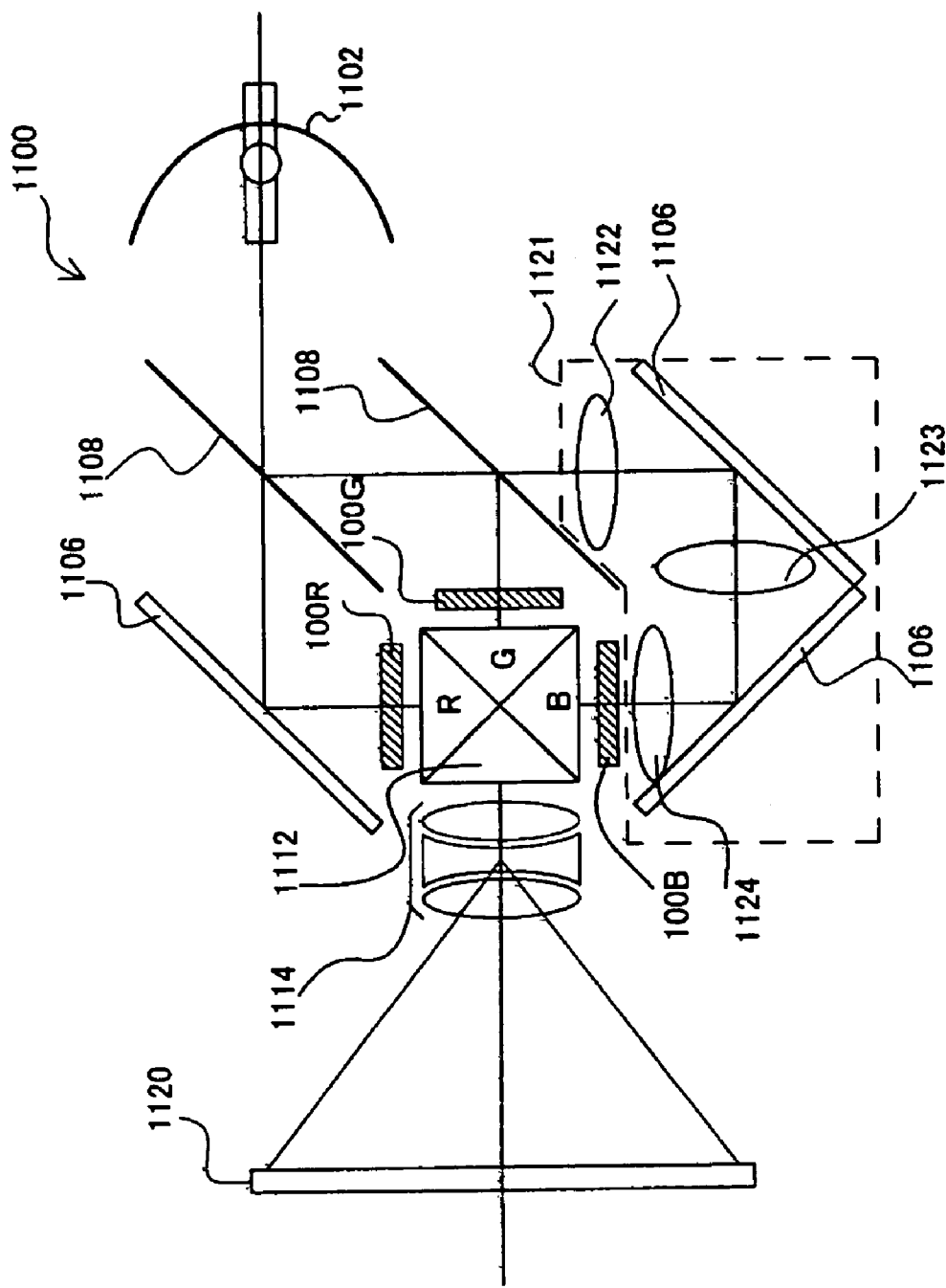
FIG. 19 is a schematic sectional view illustrating a color liquid crystal projector that is an example of a projection-type color display device according to an exemplary embodiment of an electronic apparatus of the present invention.

Next, the entire structure and, in particular, the optical structure of a projection-type color display device according to the present exemplary embodiment, which is an example of an electronic apparatus using the above-described electro-optical device as a light valve, will be described. FIG. 19 is a schematic sectional view of the projection-type color display device.

In FIG. 19, a liquid crystal projector 1100, which is an example of the projection-type color display device according to the present exemplary embodiment, has three liquid crystal modules each including a liquid crystal device in which a driving circuit is mounted on a TFT array substrate. The liquid crystal modules are used as RGB light valves 100R, 100G, and 100B. The above-described electro-optical device (refer to FIGS. 1 to 5) is used as the light valves 100R, 100G, and 100B. In the liquid crystal projector 1100, when projection light is emitted from a lamp unit 1102 that is a white light source, such as a metal halide lamp, the emitted light is divided into light components R, G, and B corresponding to the three primary colors RGB, by three mirrors 1106 and two dichroic mirrors 1108, and the light components R, G, and B are guided by the light valves 100R, 100G, and 100B corresponding to the respective colors. At this time, in particular, the light component B is guided by a relay lens system 1121 composed of an incidence lens 1122, a relay lens 1123, and an emission lens 1124 in order to prevent optical loss from occurring due to the long light path. The light components corresponding to the three primary colors modulated by the light valves 100R, 100G, and 100B are combined by a dichroic prism 1112 again and the combined light is projected onto a screen 1120 through a projection lens 1114 as a color image.

The present invention is not limited to the above-described exemplary embodiments and various changes in form and details may be made therein without departing from the spirit and scope of the invention as defined by the claims and the entire specification. The electro-optical device, the method of manufacturing the same, and the electronic apparatus that accompany such changes are also included the scope of exemplary embodiments of the present invention.

What is claimed is:

1. An electro-optical device, comprising:

a substrate;

data lines extending above the substrate;

scanning lines extending in a direction intersecting the data lines;

thin film transistors having semiconductor layers and gate electrodes to which scanning signals are supplied by the scanning lines;

pixel electrodes to which image signals are supplied by the data lines through the thin film transistors;

storage capacitors having first electrodes electrically connected to the thin film transistor and the pixel electrodes, the storage capacitors further including second electrodes arranged to face the first electrodes, and dielectric films interposed between the first electrodes and the second electrodes; and oxidation films obtained by oxidizing all surfaces of the first electrodes and the electrodes, and the oxidation films are formed on all of the first electrodes.

2. The electro-optical device according to claim 1, the surfaces including end faces of at least one of the first electrodes and the second electrodes.

3. The electro-optical device according to claim 2, the end faces including edge portions of at least one of the first electrodes and the second electrodes.

4. The electro-optical device according to claim 2, the end faces are formed on a same plane intersecting a plane of the substrate.

5. The electro-optical device according to claim 1, the oxidation films are formed on the surfaces of at least one of the first electrodes and the second electrodes, which face the dielectric films.

6. The electro-optical device according to claim 1, the thickness of the oxidation films is no less than 1.5 [nm] and no more than 30 [nm].

7. The electro-optical device according to claim 1, the dielectric films including a silicon nitride film.

8. The electro-optical device according to claim 1, the second electrodes having a fixed electric potential.

* * * * *